United States Patent
Yan et al.

(10) Patent No.: US 9,692,305 B2
(45) Date of Patent: Jun. 27, 2017

(54) RESONANT DC/DC POWER CONVERTING CIRCUIT AND METHOD FOR CONTROLLING THE SAME

(71) Applicant: DELTA ELECTRONICS, INC., Taoyuan (TW)

(72) Inventors: Chao Yan, Taoyuan (TW); Yi-Qing Ye, Taoyuan (TW); Zhi-Zhen Lian, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/958,898

(22) Filed: Dec. 3, 2015

(65) Prior Publication Data
US 2016/0190940 A1 Jun. 30, 2016

(30) Foreign Application Priority Data
Dec. 25, 2014 (CN) .......................... 2014 1 0825911

(51) Int. Cl.
*H02M 3/335* (2006.01)
*H02M 3/28* (2006.01)
*H02M 1/00* (2006.01)

(52) U.S. Cl.
CPC .... *H02M 3/285* (2013.01); *H02M 2001/0058* (2013.01); *Y02B 70/1491* (2013.01)

(58) Field of Classification Search
CPC .. H02M 1/12; H02M 7/48; H02M 2007/4822; H02M 3/285; H02M 3/33576; Y02B 70/1433

(Continued)

(56) References Cited

U.S. PATENT DOCUMENTS 6,075,350 A * 6/2000 Peng ...................... H02J 3/1814
                                                    323/207
6,574,125 B2 * 6/2003 Matsukawa ....... H02M 3/33569
                                                    363/132

(Continued)

FOREIGN PATENT DOCUMENTS

CN        101814827 A        8/2010
CN        102324852 A        1/2012

(Continued)

*Primary Examiner* — Rajnikant Patel
(74) *Attorney, Agent, or Firm* — CKC & Partners Co., Ltd.

(57) ABSTRACT

A method for controlling a resonant DC/DC power converting circuit is provided. The resonant DC/DC power converting circuit having a converter output and a converter input comprises at least two converters having similar structures and outputs connected in parallel as said converter output, and a controller. Each converter comprises a full-bridge inverter unit and a resonant unit. The full-bridge inverter unit is configured with at least four switches. The resonant unit is coupled with said full-bridge inverter unit. The controller outputs two groups of driving control signals to drive four switches in said two converters respectively. The method comprises: making said two converters operate at the same frequency and interleave with preset phase shift; and making two of driving control signals in one group interleave with preset angle to reduce output current of said converter corresponding controlled thereby, when output currents of said two converters are not approximately equal.

13 Claims, 16 Drawing Sheets

(58) Field of Classification Search
USPC ...... 363/16–20, 21.08, 21.12, 25, 36, 56.01, 363/71, 98
See application file for complete search history.

(56) References Cited

U.S. PATENT DOCUMENTS

| | | | | |
|---|---|---|---|---|
| 8,723,365 | B2* | 5/2014 | Bordry | H02J 7/345 |
| | | | | 307/77 |
| 8,780,585 | B2* | 7/2014 | Ye | H02M 3/285 |
| | | | | 363/17 |
| 8,848,399 | B2* | 9/2014 | Sagneri | H02M 3/158 |
| | | | | 363/21.02 |
| 8,964,432 | B2* | 2/2015 | Tang | H02M 7/48 |
| | | | | 363/71 |
| 8,976,557 | B2* | 3/2015 | Pouliquen | H02J 3/1842 |
| | | | | 363/71 |
| 9,300,225 | B2* | 3/2016 | Ku | H02M 7/48 |

FOREIGN PATENT DOCUMENTS

| | | |
|---|---|---|
| CN | 103248231 A | 8/2013 |
| CN | 104038070 A | 9/2014 |
| TW | 201238221 A | 9/2012 |

* cited by examiner

RESONANT DC/DC POWER CONVERTING CIRCUIT AND METHOD FOR CONTROLLING THE SAME

RELATED APPLICATIONS

This application claims priority to China Application Serial Number 201410825911.8, filed Dec. 25, 2014, which is herein incorporated by reference.

BACKGROUND

Field of Invention

The present invention relates to a power converting circuit and a control method thereof. More particularly, the present invention relates to a resonant DC/DC power converting circuit and a method for controlling the same.

Description of Related Art

With the progress of science and technology, energy conversion and employment have become increasingly important. Among the various energy conversion technologies, since the resonant converters can achieve zero voltage switching (ZVS) and zero current switching (ZCS), devices are allowed to operate at a low turn-off current and high frequency. Therefore, resonant converters have been widely applied to high efficiency and high power density power supplies.

However, when a single phase resonant converter is applied to a low voltage high current output, the current stress of the output capacitor is higher, which requires more capacitors connected in parallel to satisfy the requirements. As a result, a defect is generated. In order to overcome such a defect, N resonant converters identical to one another may be connected in an interleaved parallel manner. As such, the N phase resonant converters connected in parallel are able to reduce the overall current ripples and voltage ripples as compared with the single phase converter so as to reduce electromagnetic interferences. As a result, volumes of passive devices including inductors and capacitors are decreased to increase the dynamic response speed. In addition to that, the N phase resonant converters connected in parallel can operate alternately at the same time to improve the efficiencies of the converters and the power density.

In practical applications, parameters of the interleaved parallel converter circuit unavoidably have deviations. Hence, how to use an active current-balance control to balance the output powers of the converters has become a major issue confronted by the industry. Generally speaking, a traditional pulse width modulation (PWM) converter can realize current balance of the parallel module through adjusting the duty ratio owing to its fixed switching frequency. Although a resonant converter controls its output power through controlling the switching frequency, it is required that driving signal frequencies of switches of the converters are equal and have a phase difference of 180°/N to achieve the best current ripple cancellation effect of the converters connected in parallel when implementing the resonant converter. As a result, the switching frequency of the converters needs to be adjusted simultaneously, which causes that the resonant converter cannot achieve current balance through adjusting the duty ratio like the PWM converter and needs to adjust signal frequencies to achieve the objective of current balance.

For the forgoing reasons, there is a need to resolve the above-mentioned inconveniences and shortcomings by providing a resonant DC/DC power converting circuit and a method for controlling the same, which is also an objective that the relevant industry is eager to achieve.

SUMMARY

One objective of the present invention is to provide DC/DC power converting circuit to improve the drawbacks of the prior art.

A method for controlling a resonant DC/DC power converting circuit is provided. The resonant DC/DC power converting circuit having a converter output and a converter input comprises at least two converters having similar structures and outputs connected in parallel as said converter output, and a controller. Each said converter comprises a full-bridge inverter unit and a resonant unit. The full-bridge inverter unit is configured with at least four switches. The resonant unit is coupled with said full-bridge inverter unit. The controller outputs two groups of driving control signals to drive four switches in said two converters respectively. The method comprises: making said two converters operate at the same frequency and interleave with preset phase shift; and making two of driving control signals in one group interleave with preset angle to reduce output current of said converter corresponding controlled thereby, when output currents of said two converters are not approximately equal.

A resonant DC/DC power converting circuit having a converter output and a converter input comprising: at least two converters, a controller, a current sampling circuit, and a current-balance controller. The at least two converters have similar structures and outputs connected in parallel as said converter output. Each said converter comprises a full-bridge inverter unit and a resonant unit. The full-bridge inverter unit is configured with at least four switches. The resonant unit is coupled with said full-bridge inverter unit. The controller is configured to output at least two groups of driving control signals for controlling said switches in the two converters respectively. The current sampling circuit is configured to sample output currents of the two converters respectively to output a first current sampling signal and a second current sampling signal accordingly. The current-balance controller is configured to receive the first current sampling signal and the second current sampling signal, once it is determined that the output current of one of the two converters is greater, outputting a preset angle to the controller to make the two driving control signals in the corresponding group for the converter whose output current is greater interleave with the preset angle so as to reduce the output current thereof to achieve balance between output currents of the two converters.

According to the present invention, the embodiments of the present invention improve the problem that the resonant converters cannot achieve current balance by adjusting the signal frequencies, by way of providing a resonant DC/DC power converting circuit and a method for controlling the same.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular.

Figure 1:
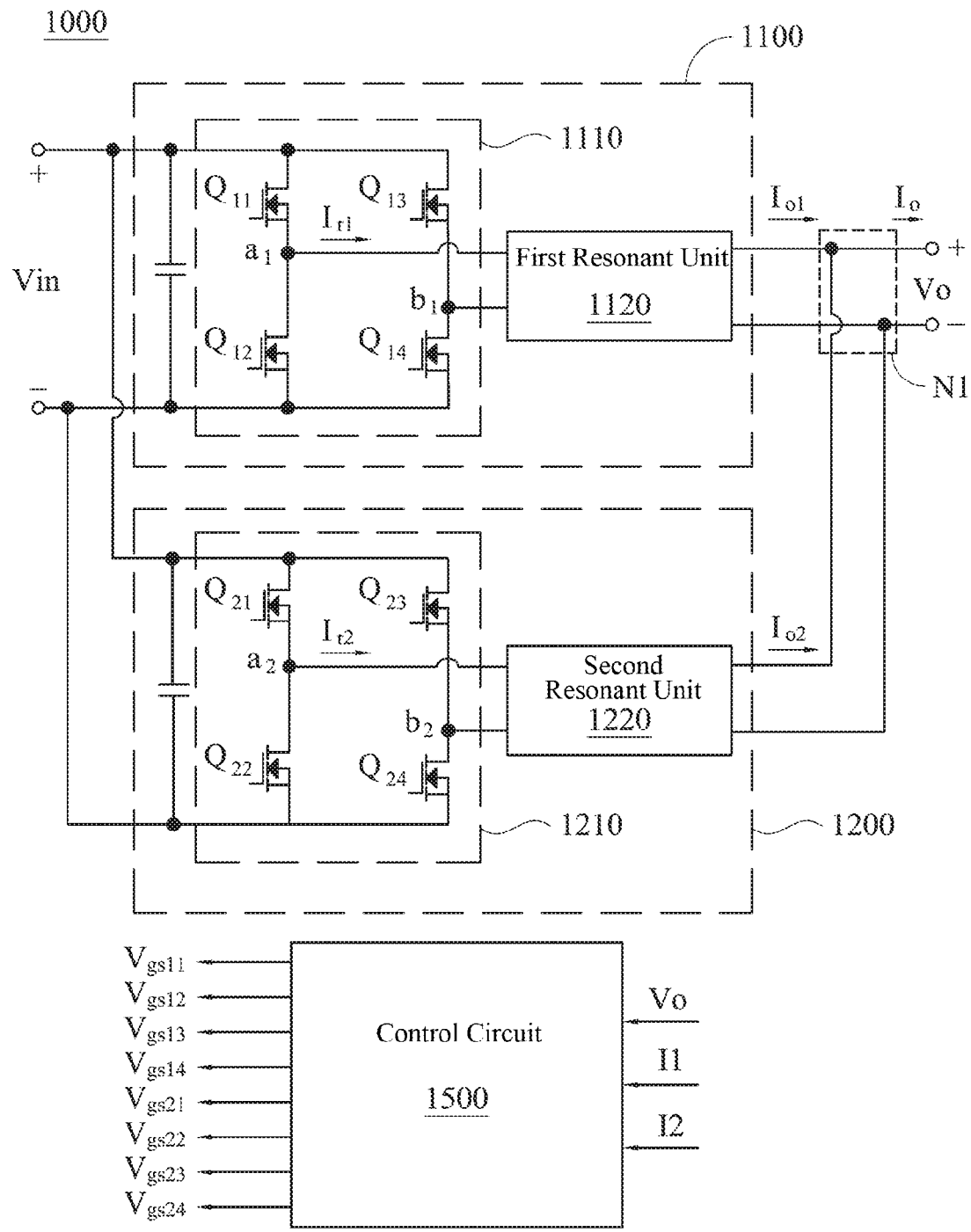
FIG. 1 depicts a schematic diagram of a resonant DC/DC power converting circuit according to one embodiment of this invention.

FIG. 1 depicts a schematic diagram of a resonant DC/DC power converting circuit 1000 according to one embodiment of this invention. As shown in the figure, a resonant DC/DC power converting circuit 1000 comprises a first converter 1100, a second converter 1200, and a control circuit 1500. An output terminal of the first converter 1100 and an output terminal of the second converter 1200 are connected in parallel at a common output terminal N1. The first converter 1100 comprises a first full-bridge inverter unit 1110 and a first resonant unit 1120. The first full-bridge inverter unit 1110 comprises a first arm and a second arm connected in parallel. The first arm comprises a first switch $Q_{11}$ and a second switch $Q_{12}$ connected in series. The second arm comprises a third switch $Q_{13}$ and a fourth switch $Q_{14}$ connected in series. The second converter 1200 comprises a second full-bridge inverter unit 1210 and a first resonant unit 1220. The second full-bridge inverter unit 1210 comprises a third arm and a fourth arm connected in parallel. The third arm comprises a fifth switch $Q_{21}$ and a sixth switch $Q_{22}$ connected in series. The fourth arm comprises a seventh switch $Q_{23}$ and an eighth switch $Q_{44}$ connected in series.

In operation, the control circuit 1500 is configured to output a first group of driving signals and a second group of driving signals for driving the switches respectively in the first full-bridge inverter unit 1110 and the second full-bridge inverter unit 1210. In order to reduce current ripples, frequencies of a plurality of driving signals in the first group of driving signals and the second group of driving signals are the same. In addition, in order to ensure that the two switches in the same arm are not conducted simultaneously, the driving signals for the two serially-connected switches in the same arm are complementary and have specific dead zones. A driving duty ratio is approximately 0.5. In addition, the control circuit 1500 is further configured to acquire an output voltage $V_o$ at the common output terminal N1, a current of the first resonant unit 1120, and a current of the second resonant unit 1220, and compares the output voltage $V_o$ at the common output terminal N1 with a reference voltage Vref, the current of the first resonant unit 1120 with a first reference current, the current of the second resonant unit 1220 with the second reference current to generate a comparison result.

For example, if there is an error between the current of the first resonant unit 1120 and the current of the second resonant unit 1220, the comparison result can indicate the above error after performing the above comparison flow. The control circuit 1500 thus adjusts phases of the driving signals of one of the first group of driving signals and the second group of driving signals according to the comparison result to allow an output of the first converter 1100 to be equal to an output of the second converter 1200. As a result, although the resonant DC/DC power converting circuit 1000 cannot achieve current balance through adjusting the signal frequencies, the resonant DC/DC power converting circuit 1000 still can achieve the current balance effect through adjusting phase-shifting angles between the driving signals of at least one of the first converter 1100 an the second converter 1200.

Figure 2:
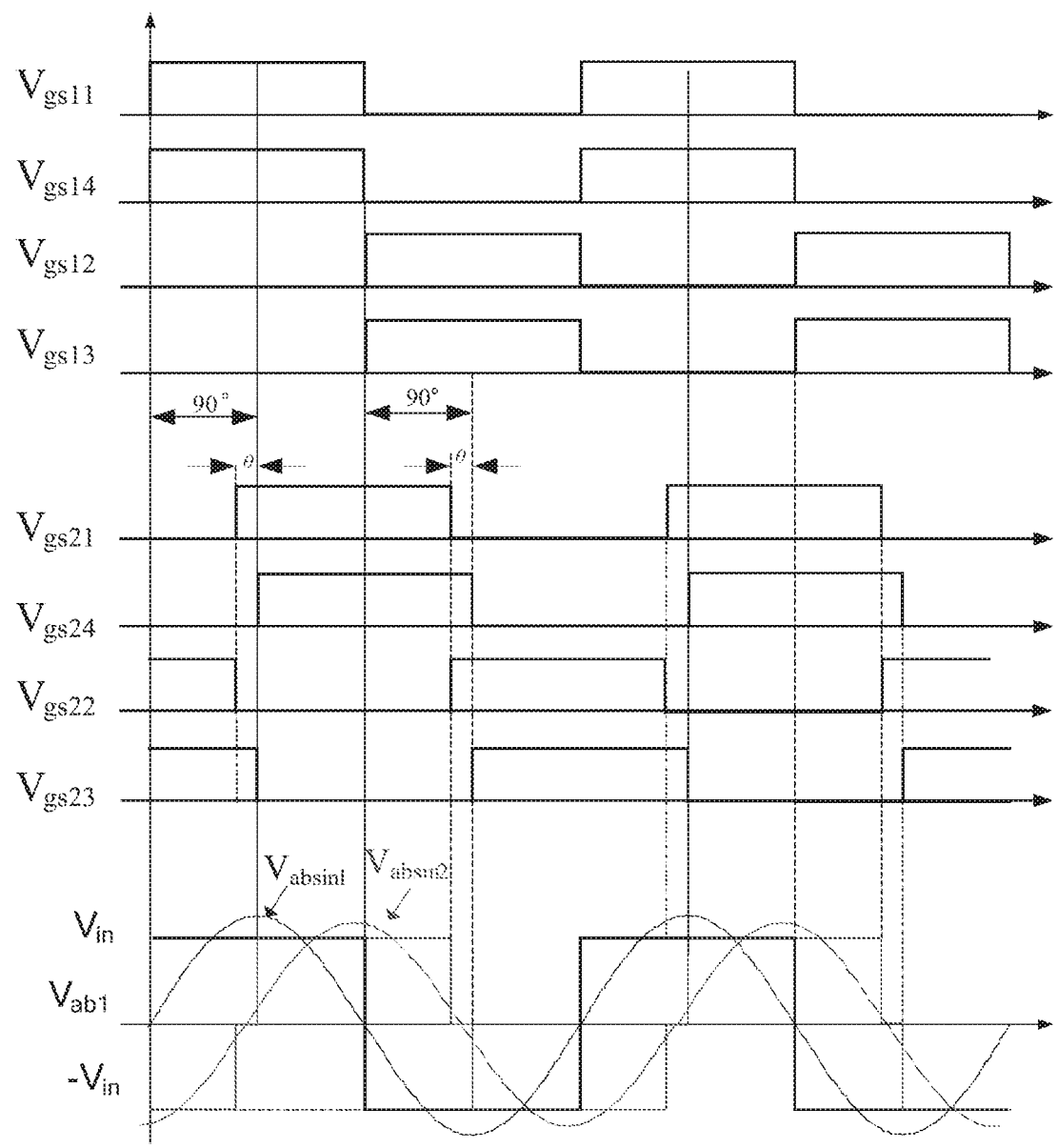
FIG. 2 depicts a schematic diagram of driving signals for a resonant DC/DC power converting circuit according to another embodiment of this invention.

In one embodiment, the first group of driving signals comprises a first driving signal to a fourth driving signal $V_{gs11}$-$V_{gs14}$. The second group of driving signals comprises a fifth driving signal to an eighth driving signal $V_{gs21}$-$V_{gs24}$. In the present embodiment, the control circuit 1500 drives the first switch to the fourth switch $Q_{11}$-$Q_{14}$ respectively by the first driving signal to the fourth driving signal $V_{gs11}$-$V_{gs14}$ and drives the fifth switch to the eighth switch $Q_{21}$-$Q_{24}$ respectively by the fifth driving signal to the eighth driving signal $V_{gs21}$-$V_{gs24}$. A description is provided with reference to FIG. 1 and FIG. 2. FIG. 2 depicts a schematic diagram of driving signals for a resonant DC/DC power converting circuit according to another embodiment of this invention. As shown in FIG. 2, the driving signals for the switches in the first converter 1100 and the second converter 1200 corresponding to each other have a specific phase shift. For example, the first driving signal $V_{gs11}$ and the fifth driving signal $V_{gs21}$ have different phases. The second driving signal $V_{gs12}$ and the sixth driving signal $V_{gs22}$ have different phases. The third driving signal $V_{gs13}$ and the seventh driving signal $V_{gs23}$ have different phases. The fourth driving signal $V_{gs14}$ and the eighth driving signal $V_{gs24}$ have different phases. In addition, the control circuit 1500 is configured to determine to adjust the phases of the first driving signal to the fourth driving signal $V_{gs11}$-$V_{gs14}$, or the phases of the fifth driving signal to the eighth driving signal $V_{gs21}$-$V_{gs24}$, or the phases of the first driving signal to the eighth driving signals $V_{gs11}$-$V_{gs24}$, based on the comparison result, so that the outputs of the first converter 1100 and the second converter 1200 are equivalent.

A description is provided with reference to FIG. 2. In another embodiment, the phase of the seventh driving signal $V_{gs23}$ lags behind the phase of the third driving signal $V_{gs13}$ by 90 degrees. The phase of the eighth driving signal $V_{gs24}$ lags behind the phase of the fourth driving signal $V_{gs14}$ by 90 degrees. If the comparison result is that the current of the first resonant unit 1120 differs from the current of the second resonant unit 1220, for example, if the current of the second resonant unit 1220 is greater than the current of the first resonant unit 1120, the control circuit 1500 adjusts the phase of the fifth driving signal $V_{gs21}$ to advance the phase of the eighth driving signal $V_{gs24}$ by a preset angle θ, and adjusts the phase of the sixth driving signal $V_{gs22}$ to advance the phase of the seventh driving signal $V_{gs23}$ by the preset angle θ. In brief, the control circuit 1500 can render a high-side switch of the first arm to advance or lag behind a low-side switch of the second arm by the preset angle θ, and render a low-side switch of the first arm to advance or lag behind a high-side switch of the second arm by the preset angle θ in a full-bridge inverter unit of a phase converter. In one embodiment, the above preset angle is greater than zero degree and smaller than 180 degrees. However, in consideration of the different resonant circuit parameters of the resonant DC/DC power converting circuit and whether the resonant DC/DC power converting circuit operates under a light load condition or a heavy load condition, a variation range of the preset angle will be different. Generally speaking, the variation range of the preset angle under the light load condition is wider than the variation range of the preset angle under the heavy load condition. Under the condition of having specific resonant circuit parameters, the preset angle of the resonant DC/DC power converting circuit under the light load condition is greater than zero degree and smaller than ³⁄₁₀π. However, as mentioned previously, the variation range of the preset angle may be wider than ³⁄₁₀π with the change of the resonant circuit parameters.

A description as to a voltage $V_{absin1}$ of the first resonant unit 1120 and a voltage $V_{absin2}$ of the second resonant unit 1220 after adjustment is provided with reference to the bottom of FIG. 2. Hence, it can be seen from the figure that the voltage $V_{absin2}$ of the second resonant unit 1220 after adjustment becomes smaller. As a result, the current of the second resonant unit 1220 becomes less correspondingly and an output power of the second resonant unit 1220 also becomes less. Accordingly, although the current of the second resonant unit 1220 is originally greater than the current of the first resonant unit 1120, the current of the second resonant unit 1220 becomes less correspondingly after the control circuit 1500 performs the adaptive adjustment to the second resonant unit 1220 according to the embodiment of the present invention. The current of the first resonant unit 1120 thus tends to be consistent with the current of the second resonant unit 1220 so as to achieve current balance effect. However, the present invention is not limited to the above embodiment, which only serves as an example for illustrating one of the methods for realizing the present invention. In other embodiments, if the comparison result is that the current of the first resonant unit 1120 is greater than the current of the second resonant unit 1220, the control circuit 1500 may adjust the phases of the first group of driving signals to reduce the current of the first resonant unit 1120 so as to achieve the current balance effect. Or, in some embodiments, the control circuit 1500 may adjust the phases of the first group of driving signals together with the second group of driving signals depending on the situation to achieve the current balance effect.

Figure 3:
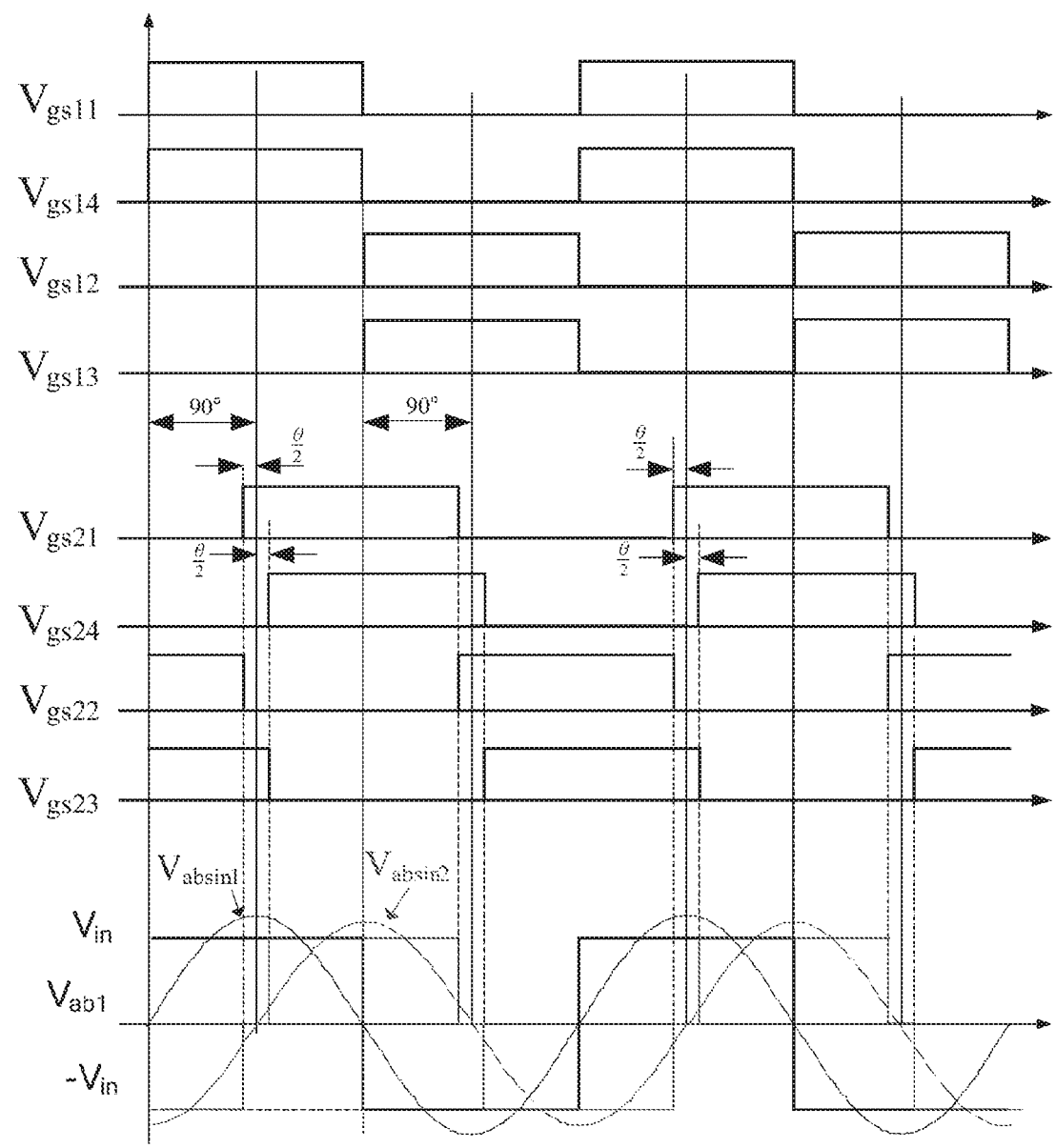
FIG. 3 depicts a schematic diagram of driving signals for a resonant DC/DC power converting circuit according to still another embodiment of this invention.

FIG. 3 depicts a schematic diagram of driving signals for a resonant DC/DC power converting circuit according to still another embodiment of this invention. In still another embodiment, the driving signals are preset as follows. The phases of the fifth driving signal $V_{gs21}$ and the eighth driving signal $V_{gs24}$ lag behind the phases of the first driving signal $V_{gs11}$ and the fourth driving signal $V_{gs14}$ by 90 degrees. The phases of the sixth driving signal $V_{gs22}$ and the seventh driving signal $V_{gs23}$ lag behind the phases of the second driving signal $V_{gs12}$ and the third driving signal $V_{gs13}$ by 90 degrees.

After the above mentioned comparison flow is performed, if the comparison result is that the current of the first resonant unit 1120 differs from the current of the second resonant unit 1220, for example, if the current of the second resonant unit 1220 is greater than the current of the first resonant unit 1120, the control circuit 1500 adjusts the phase of the fifth driving signal $V_{gs21}$ forward from an original point which lags behind the first driving signal $V_{gs11}$ by 90 degrees by one half of the preset angle θ/2. The control circuit 1500 adjusts the phase of the eighth driving signal $V_{gs24}$ backward from an original point which lags behind the fourth driving signal $V_{gs11}$ by 90 degrees by one half of the preset angle θ/2. The control circuit 1500 adjusts the phase of the sixth driving signal $V_{gs22}$ forward from an original point which lags behind the second driving signal $V_{gs12}$ by 90 degrees by one half of the preset angle θ/2. The control circuit 1500 adjusts the phase of the seventh driving signal $V_{gs23}$ backward from an original point which lags behind the third driving signal $V_{gs13}$ by 90 degrees by one half of the preset angle θ/2.

A description as to the voltage $V_{absin1}$ of the first resonant unit 1120 and the voltage $V_{absin2}$ of the second resonant unit 1220 after adjustment is provided with reference to the bottom of FIG. 3. Hence, it can be seen from the figure that the voltage $V_{absin2}$ of the second resonant unit 1220 after adjustment becomes smaller. As a result, the current of the second resonant unit 1220 becomes less correspondingly and the output power of the second resonant unit 1220 also becomes less. Accordingly, although the current of the second resonant unit 1220 is originally greater than the current of the first resonant unit 1120, the current of the second resonant unit 1220 becomes less correspondingly after the control circuit 1500 performs the adaptive adjustment to the second resonant unit 1220 according to the embodiment of the present invention. The current of the first resonant unit 1120 thus tends to be consistent with the current of the second resonant unit 1220 so as to achieve the current balance effect. However, the present invention is not limited to the above embodiment, which only serves as an example for illustrating one of the methods for realizing the present invention. In other embodiments, if the comparison result is that the current of the first resonant unit 1120 is greater than the current of the second resonant unit 1220, the control circuit 1500 may adjust the phases of the first group of driving signals to reduce the current of the first resonant unit 1120 so as to achieve the current balance effect. Or, in some embodiments, the control circuit 1500 may adjust the phases of the first group of driving signals together with the second group of driving signals depending on the situation to achieve the current balance effect.

In one embodiment, the resonant converter only comprising two converters is taken as an example for illustration and a description is provided with reference to a control schematic diagram shown in FIG. 3 correspondingly. The control circuit 1500 can adjust the switches of the arms simultaneously to advance or lag behind so as to allow the fifth switch $Q_{21}$ and the sixth switch $Q_{22}$ to have a phase shift of (90°−θ/2) respectively relative to the first switch $Q_{11}$ and the second switch $Q_{12}$ and the seventh switch $Q_{23}$ and the eighth switch $Q_{24}$ to have a phase shift of (90°+θ/2) respectively relative to the third switch $Q_{13}$ and the fourth switch $Q_{14}$ (the magnitude of θ is determined by a difference value between the two phase currents to allow the duty ratio of a voltage $V_{ab2}$ of the second resonant circuit to be D=(π−θ)/π). Similarly, the objective of reducing the voltage $V_{ab2}$ to further decrease $I_{o2}$ so that $I_{o2}=I_{o1}$ can be achieved. In the present embodiment, the current of the second resonant unit in the second converter is greater than that of the first resonant unit, the preset angle θ2 may therefore be adjusted to reduce the current of the second resonant unit. However, in other cases, if the current of the first resonant unit is greater than the current of the second resonant unit, the preset angle θ1 of the first resonant unit may be adjusted correspondingly at this time to reduce the current of the first resonant unit. Generally speaking, parameter deviations of a two phase converter is smaller in practical applications, the preset angle θi (i could be 1 or 2) is smaller. When operating under the light load condition, θi increases more when compared with the heavy load condition, which will possibly affect the realizing of zero voltage switching of the switches. Hence, in practical applications, 0≤θi≤3/10π may be set to allow the duty ratio of the voltage $V_{ab2i}$ across two terminals of the resonant network to be 0.7≤Di≤1. In the following, the preset angle θ1 can also be called a first compensation angle, the preset angle θ2 can also be called a second compensation angle.

Figure 4:
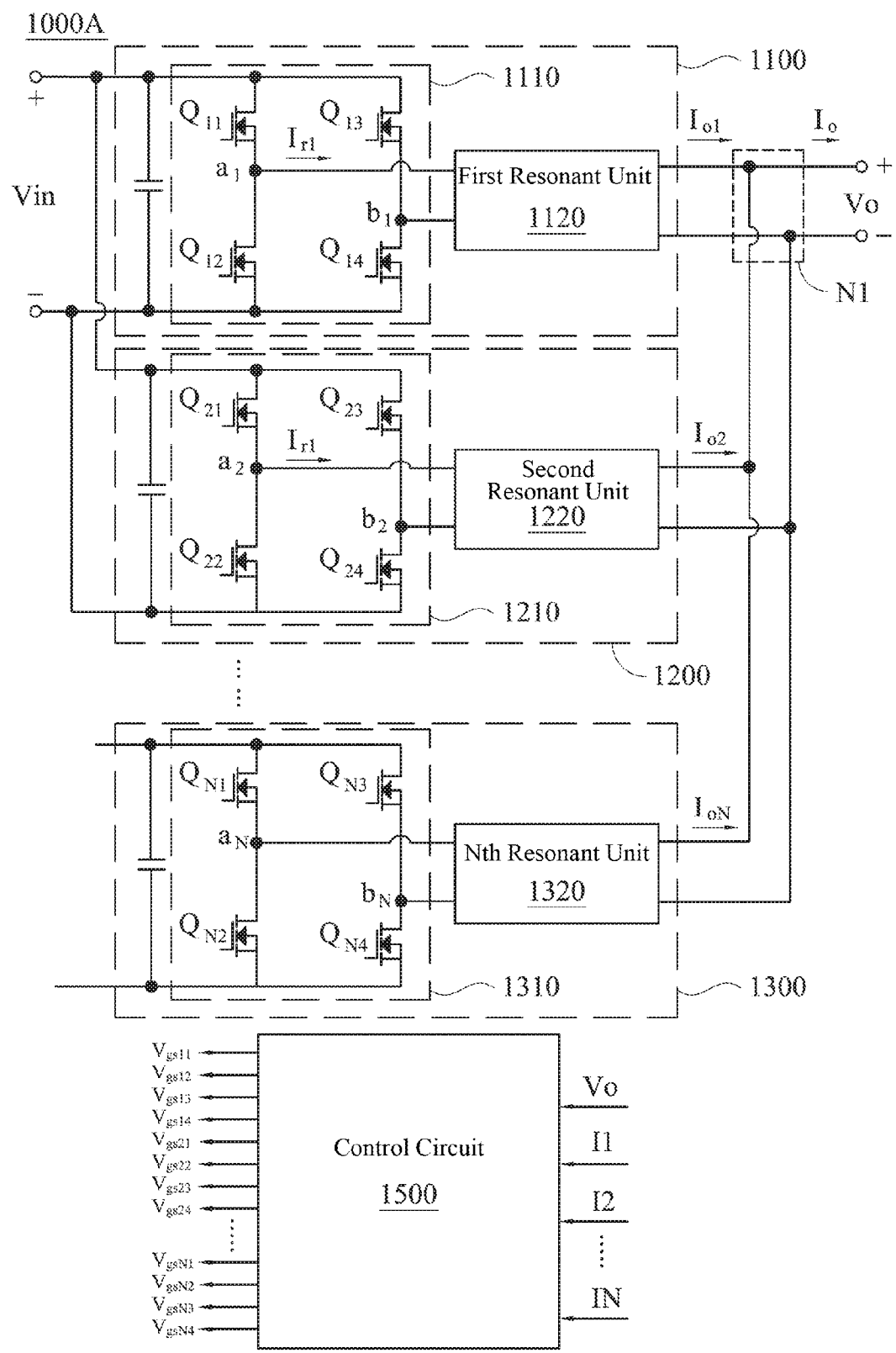
FIG. 4 depicts a schematic diagram of a resonant DC/DC power converting circuit according to yet another embodiment of this invention.

FIG. 4 depicts a schematic diagram of a resonant DC/DC power converting circuit 1000A according to yet another embodiment of this invention. As compared with the resonant DC/DC power converting circuit 1000 shown in FIG. 1, the resonant DC/DC power converting circuit 1000A further comprises a third converter to an Nth converter, N is a positive integer. Similar to the first converter 1100 and the second converter 1200, the third converter to the Nth converter comprise a third full-bridge inverter unit to an Nth full-bridge inverter unit and a third resonant unit to an Nth resonant unit, respectively. Each of the third full-bridge inverter unit to the Nth full-bridge inverter unit comprises two arms. Each of the two arms comprises two switches.

In operation, the control circuit 1500 outputs a third group of driving signals to an Nth group of driving signals correspondingly for driving a plurality of switches respectively in the third full-bridge inverter unit to the Nth full-bridge inverter unit. Frequencies of a plurality of driving signals in the third group of driving signals to the Nth group of driving signals are the same. In addition, the control circuit 1500 is further configured to acquire the output voltage $V_o$ at the common output terminal N1 and the current of the first resonant unit 1120 to a current of the Nth resonant unit, and compare the output voltage $V_o$ at the common output terminal N1 with the reference voltage Vref, and the current of the first resonant unit 1120 to the current of the Nth resonant unit 1320 with the first reference current to the Nth reference current to generate another comparison result. Based on the comparison result, except for the driving signals for the converter corresponding to a minimum current among the current of the first resonant unit 1120 to the current of the Nth resonant unit 1320, the control circuit 1500 adjusts phases of all the other driving signals so that an output of the first converter 1100 to an output of the Nth converter 1320 are equal. However, the present invention is not limited to the above embodiment, which only serves as an example for illustrating one of the methods for realizing the present invention. In other embodiments, the control circuit 1500 may adjust the phases of the first group of driving signals to the Nth group of driving signals depending on the situation to achieve output current balance of all the converters in the resonant DC/DC power converting circuit 1000A.

Figure 5:
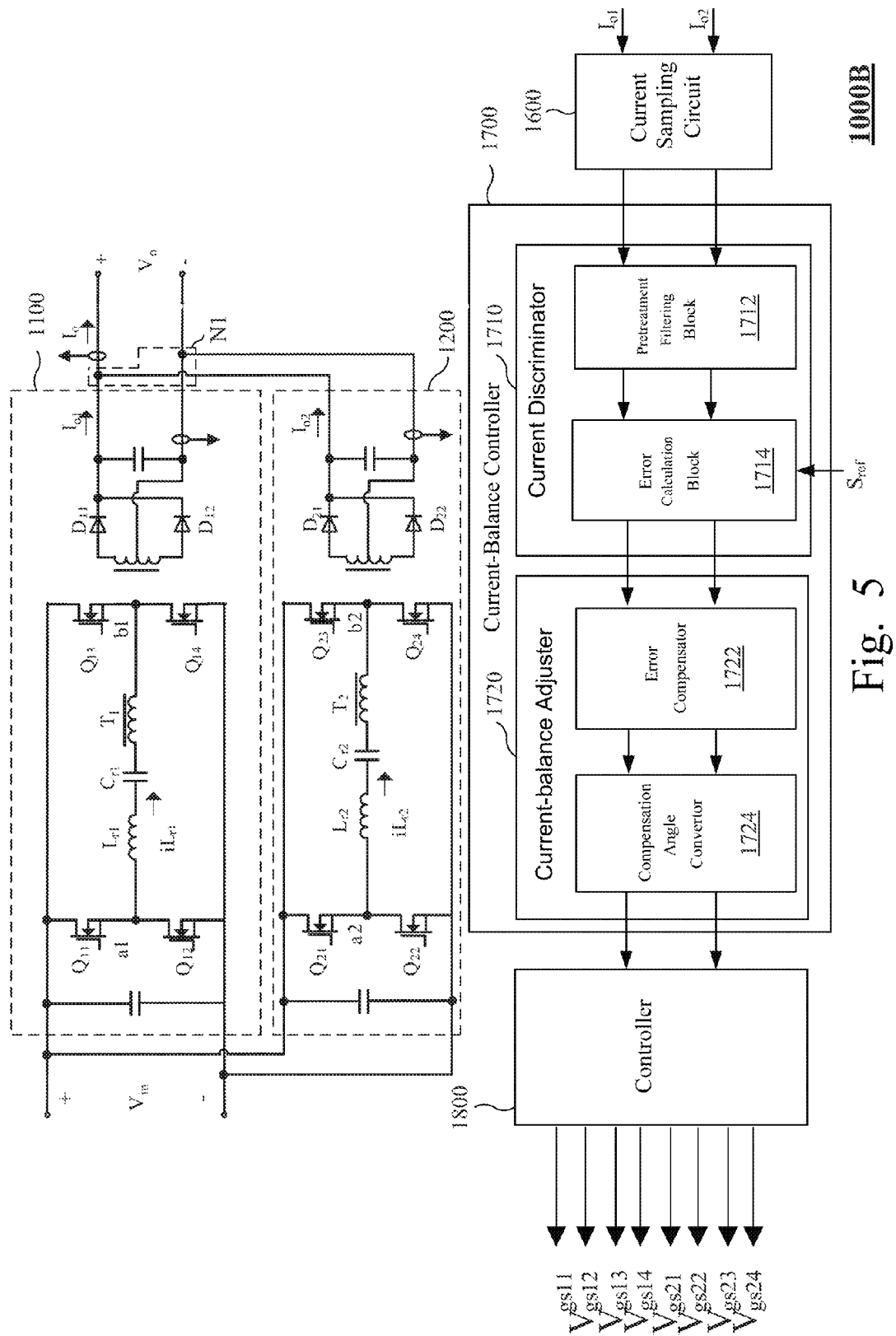
FIG. 5 depicts a schematic diagram of a resonant DC/DC power converting circuit according to another embodiment of this invention.

FIG. 5 depicts a schematic diagram of a resonant DC/DC power converting circuit 1000B according to another embodiment of this invention. As compared with the resonant DC/DC power converting circuit 1000 shown in FIG. 1, the circuit structures of resonant circuits and the control circuit 1500 in the resonant DC/DC power converting circuit 1000B are depicted in detail. As shown in the figure, each of the resonant units comprises a capacitor $C_{r1}$, an inductor $L_{r1}$, a transformer $T_1$, and diodes $D_{11}$, $D_{12}$. In addition, the control circuit 1500 in FIG. 1 may be realized by a current-balance controller 1700 and a controller 1800 shown in FIG. 5, but the present invention is not limited in this regard. The method for realizing the control circuit is provided in the following.

A description is provided with reference to FIG. 5. The resonant DC/DC power converting circuit 1000B comprises at least two converters having similar structures, a current sampling circuit 1600, the current-balance controller 1700 and the controller 1800. The above two converters are the first converter 1100 and the second converter 1200. The first converter 1100 comprises the first full-bridge inverter unit and the first resonant unit. The first full-bridge inverter unit comprises at least four switches (such as Q11-Q14). The second converter 1200 comprises the second full-bridge inverter unit and the second resonant unit. The second full-bridge inverter unit comprises at least four switches (for example: Q21-Q24). The first resonant unit comprises a capacitor $C_{r1}$, an inductor $L_{r1}$, a transformer $T_1$, and diodes $D_{11}$, $D_{12}$. The second resonant unit comprises a capacitor $C_{r2}$, an inductor $L_{r2}$, a transformer $T_2$, and diodes $D_{21}$, $D_{22}$. The output terminal of the first converter 1100 and the output terminal of the second converter 1200 are connected in parallel at the common output terminal N1.

In addition, the controller 1800 is configured to output at least a first group of driving control signals and a second group of driving control signals for controlling the two converters. The first group of driving control signals comprises at least four driving control signals (such as $V_{gs11}$-

$V_{gs14}$) for driving the four switches (such as Q11-Q14). The second group of driving control signals comprises at least four driving control signals (such as $V_{gs21}$-$V_{gs24}$) for driving the four switches (such as Q21-Q24). The current sampling circuit 1600 is configured to sample an output current $I_{o1}$ of the first converter 1100 and an output current $I_{o2}$ of the second converter 1200 to output a first current sampling signal and a second current sampling signal correspondingly. The current-balance controller 1700 is configured to receive the first current sampling signal and the second current sampling signal. Once it is determined that the current of one of the two converters 1100, 1200 is greater, the current-balance controller 1700 outputs a preset angle to the controller 1800 to make the two driving control signals in the corresponding group for the converter whose output current is greater interleave with the preset angle so as to reduce the output current thereof to achieve balance between output currents of the two converters 1100, 1200.

In one embodiment, the current-balance controller 1700 is a software module embedded in software of the controller 1800. In another embodiment, the current-balance controller 1700 is a hardware module disposed external to the controller 1800. In still another embodiment, part of the current-balance controller 1700 is a software module and part of the current-balance controller 1700 is a hardware module. The software module of the current-balance controller 1700 is embedded in the controller 1800. The hardware module of the current-balance controller 1700 is disposed external to the controller 1800.

A description is provided with reference to FIG. 5. The current-balance controller 1700 comprises a current discriminator 1710 and a current-balance adjuster 1720. The current discriminator 1710 is configured to receive a reference signal $S_{ref}$ and the first current sampling signal and the second current sampling signal to output at least a current difference signal when the two current sampling signals are not approximately equal. The current-balance adjuster 1720 is configured to receive the current difference signal to output the preset angle to the controller 1800.

In one embodiment, the current discriminator 1710 comprises a pretreatment filtering block 1712 and an error calculation block 1714. The pretreatment filtering block 1712 is configured to receive the first current sampling signal and the second current sampling signal conditioned thereby and output the first current sampling process signal and the second current sampling process signal. The error calculation block 1714 is configured to receive the reference signal $S_{ref}$, the first current sampling process signal, and the second current sampling process signal to output the first difference value signal and the second difference value signal.

In another embodiment, the current-balance adjuster 1720 comprises an error compensator 1722 and a compensation angle convertor 1724. The error compensator 1722 is configured to receive the current difference signal and output a current compensation signal. The compensation angle convertor 1724 is configured to receive the current compensation signal and output the preset angle to the controller 1800. In yet another embodiment, the reference signal $S_{ref}$ is the first current sampling signal, the second current sampling signal, or one half of an output current of the resonant converting circuit.

Figure 6:
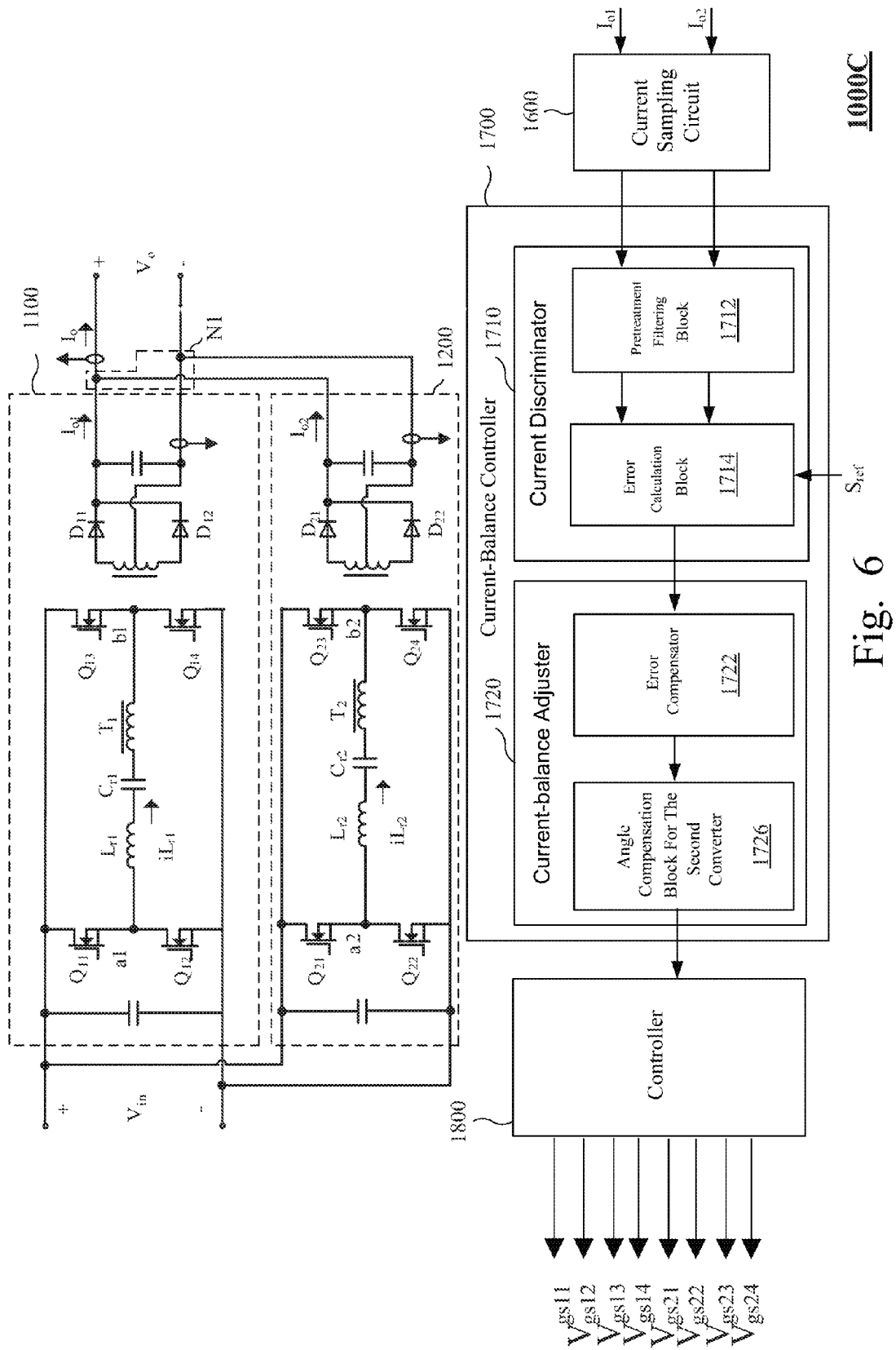
FIG. 6 depicts a schematic diagram of a resonant DC/DC power converting circuit according to still another embodiment of this invention.

FIG. 6 depicts a schematic diagram of a resonant DC/DC power converting circuit 1000C according to still another embodiment of this invention. As compared with the resonant DC/DC power converting circuit 1000 shown in FIG. 1, the circuit structures of the resonant circuits and the control circuit 1500 in the resonant DC/DC power converting circuit 1000C are depicted in detail. As shown in the figure, the first resonant unit comprises the capacitor $C_{r1}$, the inductor $L_{r1}$, the transformer $T_1$, and the diodes $D_{11}$, $D_{12}$. The second resonant unit comprises the capacitor $C_{r2}$, the inductor $L_{r2}$, the transformer $T_2$, and the diodes $D_{21}$, $D_{22}$. In addition, the control circuit 1500 in FIG. 1 may be realized by the current-balance controller 1700 and the controller 1800 shown in FIG. 6, but the present invention is not limited in this regard. The method for realizing the control circuit is provided in the following.

As shown in FIG. 6, the current-balance controller 1700 comprises the current discriminator 1710 and the current-balance adjuster 1720. The current discriminator 1710 is configured to receive the first current sampling signal and the second current sampling signal to output a difference value signal. The current-balance adjuster 1720 is configured to receive the difference value signal to output a preset angle of the second group of driving control signals to the controller 1800. A preset angle of the first group of driving control signals is zero. In one embodiment, the second converter is the converter which has a greater output current between the two converter.

In another embodiment, the current discriminator 1710 comprises the pretreatment filtering block 1712 and the error calculation block 1714. The pretreatment filtering block 1712 is configured to receive the first current sampling signal and the second current sampling signal conditioned thereby and output the first current sampling process signal and the second current sampling process signal. The error calculation block 1714 is configured to receive the first current sampling process signal and the second current sampling process signal to output the difference value signal.

In still another embodiment, the current-balance adjuster 1720 comprises the error compensator 1722 and the angle compensation block for the second converter 1726. The error compensator 1722 is configured to receive the difference value signal so as to output a compensation signal. The angle compensation block for the second converter 1726 is configured to receive the compensation signal and convert the compensation signal into the preset angle signal and output the preset angle signal to the second group of driving control signals in the controller 1800 correspondingly.

Figure 7:
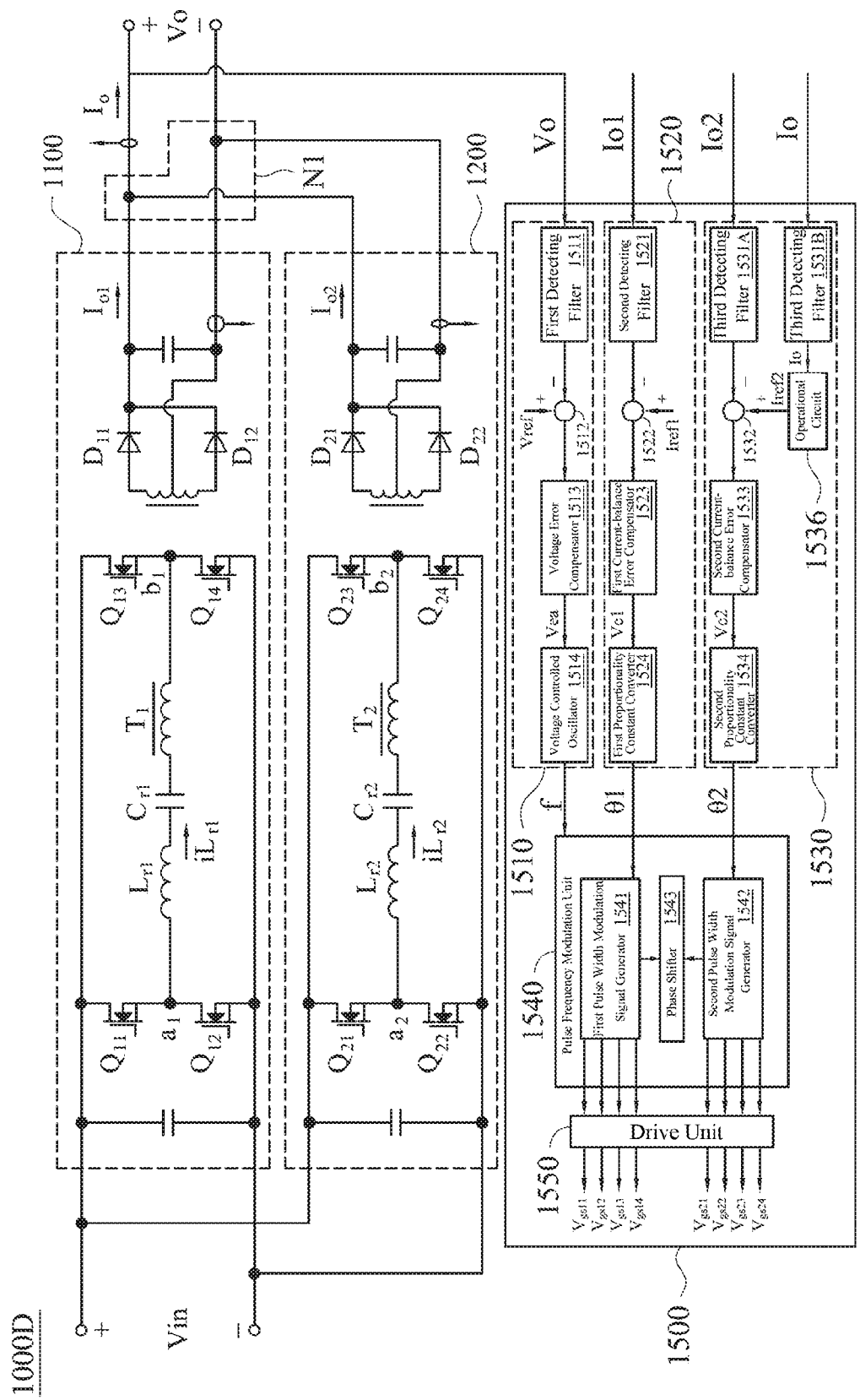
FIG. 7 depicts a schematic diagram of a resonant DC/DC power converting circuit according to another embodiment of this invention.

FIG. 7 depicts a schematic diagram of a resonant DC/DC power converting circuit 1000D according to another embodiment of this invention. The resonant DC/DC power converting circuit 1000D shown in FIG. 7 may be one of the methods to realize the resonant DC/DC power converting circuit 1000B shown in FIG. 5. For example, the pretreatment filtering block 1712 in FIG. 5 may be realized by a second detecting filter 1521, a third detecting filter 1531A, and a third detecting filter 1531B shown in FIG. 7. The error calculation block 1714 in FIG. 5 may be realized by a first arithmetic logic unit 1522 and a second arithmetic logic unit 1532 shown in FIG. 7. The error compensator 1722 in FIG. 5 may be realized by a first current-balance error compensator 1523 and a second current-balance error compensator 1533 shown in FIG. 7. The compensation angle convertor 1724 in FIG. 5 may be realized by a first proportionality constant converter 1524, a second proportionality constant converter 1534, and a pulse frequency modulation unit 1540 shown in FIG. 7.

A description is provided with reference to FIG. 7. The second detecting filter 1521 is configured to filter the output current $I_{o1}$ of the first converter 1100. The third detecting filter 1531A is configured to filter the output current $I_{o2}$ of the second converter 1200. The third detecting filter 1531B is configured to filter an output current $I_o$ of the first converter 1100 and the second converter 1200. After that, the first arithmetic logic unit 1522 is configured to receive the filtered output current $I_{o1}$ of the first converter 1100 and a first reference current Iref1 and subtract the filtered output current $I_{o1}$ of the first converter 1100 from the first reference current Iref1 to generate the first difference value signal. The second arithmetic logic unit 1532 is configured to receive the filtered output current $I_{o2}$ of the second converter 1200 and a second reference current Iref2 and subtract the filtered output current $I_{o2}$ of the second converter 1200 from the second reference current Iref2 to generate the second difference value signal.

Then, the first current-balance error compensator 1523 is configured to receive the first difference value signal to generate a first compensation signal vc1. The second current-balance error compensator 1533 is configured to receive the second difference value signal to generate a second compensation signal vc2. After that, the first proportionality constant converter 1524 is configured to receive and convert the first compensation signal vc1 to generate a first compensation angle θ1. The second proportionality constant converter 1534 is configured to receive and convert the second compensation signal vc2 to generate a second compensation angle θ2. The pulse frequency modulation unit 1540 then receives the first compensation angle θ1 and the second compensation angle θ2 and outputs a first pulse width modulation signal to a fourth pulse width modulation signal PWM11-PWM14 based on the first compensation angle θ1 and a fifth pulse width modulation signal to an eighth pulse width modulation signal PWM21-PWM24 based on the second compensation angle θ2.

As compared with the resonant DC/DC power converting circuit 1000 shown in FIG. 1, the circuit structures of the resonant circuits and the control circuit 1500 in the resonant DC/DC power converting circuit 1000D in FIG. 7 are depicted in detail. The control circuit 1500 comprises a voltage processing unit 1510, a first current processing unit 1520, a second current processing unit 1530, and a phase adjustment unit. The above voltage processing unit 1510 is configured to receive the output voltage $V_o$ at the common output terminal N1 and the reference voltage Vref and compare the output voltage $V_o$ at the common output terminal N1 with the reference voltage Vref to generate a voltage comparison result, and output a frequency f based on the voltage comparison result.

In addition to that, the first current processing unit 1520 is configured to receive the current of the first resonant unit 1120 and the first reference current Iref1 and compare the current of the first resonant unit 1120 with the first reference current Iref1 to generate a first current comparison result, and output the first compensation angle θ1 based on the first current comparison result. The second current processing unit 1530 is configured to receive the current of the second resonant unit 1220 and the second reference current Iref2 and compare the current of the second resonant unit 1220 with the second reference current Iref2 to generate a second current comparison result, and output the second compensation angle θ2 based on the second current comparison result. The phase adjustment unit is configured to receive the frequency f, the first compensation angle θ1, and the second compensation angle θ2 to adjust the phases of the first driving signal to the fourth driving signal $V_{gs11}$-$V_{gs14}$ based on the frequency f and the first compensation angle θ1 or the phases of the fifth driving signal to the eighth driving signal $V_{gs21}$-$V_{gs24}$ based on the frequency f and the second compensation angle θ2. Hence, the resonant DC/DC power converting circuit 1000D can achieve the current balance effect by adjusting the phases of the driving signals of at least one of the first converter 1100 and the second converter 1200.

In one embodiment, a frequency of the driving signals is determined by the voltage processing unit 1510. The voltage processing unit 1510 comprises a arithmetic logic unit 1512, a voltage error compensator 1513, and a voltage controlled oscillator 1514. The arithmetic logic unit 1512 is configured to receive the output voltage $V_o$ at the common output terminal N1 actually detected and the reference voltage Vref and subtract the output voltage $V_o$ at the common output terminal N1 from the reference voltage Vref to generate a voltage difference signal. The voltage error compensator 1513 is configured to receive the voltage difference signal to generate a voltage compensation signal Vea. The voltage controlled oscillator 1514 is configured to receive and convert the voltage compensation signal Vea to generate the frequency f. When realizing the present invention, the voltage error compensator 1513 is an operational amplifier with a compensating network or is implemented in a digital manner correspondingly for achieving the astatic regulation of the output voltage relative to the reference voltage Vref.

In another embodiment, the first current processing unit 1520 comprises the first arithmetic logic unit 1522, the first current-balance error compensator 1523, and the first proportionality constant converter 1524. The first arithmetic logic unit 1522 is configured to receive the current of the first resonant unit 1120 and the first reference current Iref1 and subtract the current of the first resonant unit 1120 from the first reference current Iref1 to generate a first current difference signal. The first current-balance error compensator 1523 is configured to receive the first current difference signal to generate a first current compensation signal vc1. The first proportionality constant converter 1524 is configured to receive and convert the first current compensation signal vc1 to generate the first compensation angle θ1.

In still another embodiment, the second current processing unit 1530 comprises the second arithmetic logic unit 1532, the second current-balance error compensator 1533, and the second proportionality constant converter 1534. The second arithmetic logic unit 1532 is configured to receive the current of the second resonant unit 1220 and the second reference current Iref2 and subtract the current of the second resonant unit 1220 from the second reference current Iref2 to generate a second current difference signal. The second current-balance error compensator 1533 is configured to receive the second current difference signal to generate a second current compensation signal vc2. The second proportionality constant converter 1534 is configured to receive and convert the second current compensation signal vc2 to generate the second compensation angle θ2.

In yet another embodiment, the first reference current Iref1 and the second reference current Iref2 received by the first arithmetic logic unit 1522 and the second arithmetic logic unit 1532 may be one half of the output current $I_o$ at the common output terminal N1. The second current processing unit 1530 may comprise an operational circuit 1536. The operational circuit 1536 is configured to receive the output current $I_o$ at the common output terminal N1 and reduce a value of the output current $I_o$ at the common output terminal N1 by half so as to generate the first reference current Iref1 and the second reference current Iref2.

When realizing the present invention, the first current-balance error compensator 1523 and the second current-balance error compensator 1533 are operational amplifiers with compensating networks or are implemented in a digital manner correspondingly for achieving the astatic regulation of the output currents $I_{oi}$ (i=1, 2) relative to the reference currents.

A description is provided with reference to FIG. 7. In still another embodiment, in order to maintain the interleaving effect, the phases of the seventh switch $Q_{23}$ and the eighth switch $Q_{44}$ may be kept unchanged, and the fifth switch $Q_{21}$ and the sixth switch $Q_{22}$ are adjusted to respectively advance the eighth driving signal $Q_{24}$ and the seventh driving signal $Q_{23}$ by the preset angle θ (the magnitude of θ is determined by a difference value between the two phase currents). The voltage $V_{ab2}$ of the second resonant circuit is thus reduced. The duty ratio D=(π−θ)/π), $iL_{r2}$ is reduced and $I_{o2}$ becomes less correspondingly to approximate $I_{o1}$. The output voltage is adjusted through adjusting the switching frequency to eventually achieve balance of the two phase currents.

Figure 8:
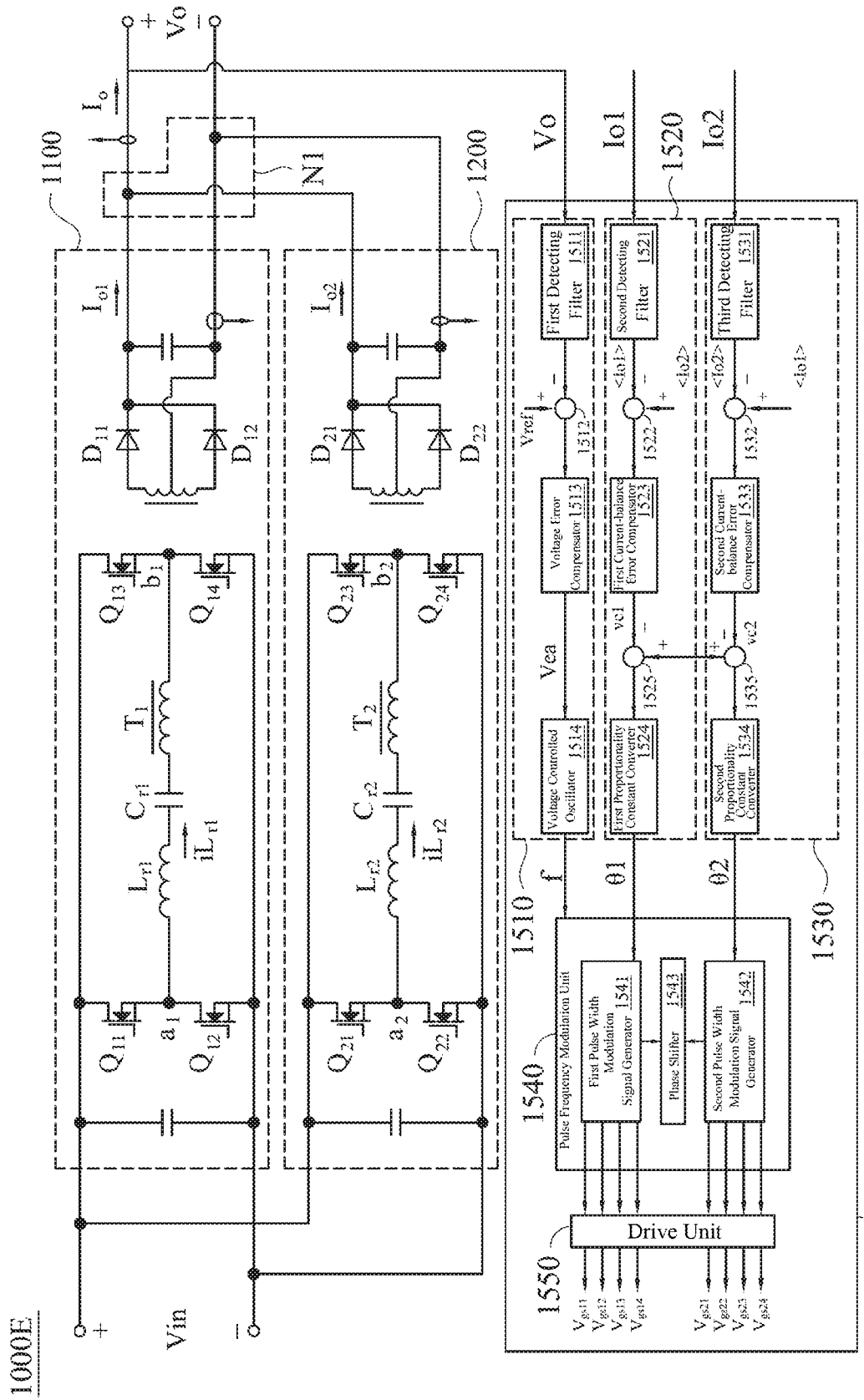
FIG. 8 depicts a schematic diagram of a resonant DC/DC power converting circuit according to still another embodiment of this invention.

FIG. 8 depicts a schematic diagram of a resonant DC/DC power converting circuit 1000E according to still another embodiment of this invention. The resonant DC/DC power converting circuit 1000E shown in FIG. 8 may be one of the methods to realize the resonant DC/DC power converting circuit 1000B shown in FIG. 5. For example, the pretreatment filtering block 1712 in FIG. 5 may be realized by the second detecting filter 1521 and a third detecting filter 1531 shown in FIG. 8. The error calculation block 1714 in FIG. 5 may be realized by the first arithmetic logic unit 1522 and the second arithmetic logic unit 1532 shown in FIG. 8. The error compensator 1722 in FIG. 5 may be realized by the first current-balance error compensator 1523 and the second current-balance error compensator 1533 shown in FIG. 8. The compensation angle convertor 1724 in FIG. 5 may be realized by the first proportionality constant converter 1524, the second proportionality constant converter 1524, and the pulse frequency modulation unit 1540 shown in FIG. 8.

A description is provided with reference to FIG. 8. The second detecting filter 1521 is configured to filter the output current $I_{o1}$ of the first converter 1100. The third detecting filter 1531 is configured to filter the output current $I_{o2}$ of the second converter 1200. After that, the first arithmetic logic unit 1522 is configured to receive the filtered output current $I_{o1}$ of the first converter 1100 and the first reference current Iref1 and subtract the filtered output current $I_{o1}$ of the first converter 1100 from the first reference current Iref1 to generate the first difference value signal. The second arithmetic logic unit 1532 is configured to receive the filtered output current $I_{o2}$ of the second converter 1200 and the second reference current Iref2 and subtract the filtered output current $I_{o2}$ of the second converter 1200 from the second reference current Iref2 to generate the second difference value signal.

Then, the first current-balance error compensator 1523 is configured to receive the first difference value signal to generate the first compensation signal vc1. The second current-balance error compensator 1533 is configured to receive the second difference value signal to generate the second compensation signal vc2. After that, the first proportionality constant converter 1524 generates the first compensation angle θ1 based on the first compensation signal vc1. The second proportionality constant converter 1534 generates the second compensation angle θ2 based on the second compensation signal vc2. The pulse frequency modulation unit 1540 then receives the first compensation angle θ1 and the second compensation angle θ2 and outputs the first pulse width modulation signal to the fourth pulse width modulation signal PWM11-PWM14 based on the first compensation angle θ1 and the fifth pulse width modulation signal to the eighth pulse width modulation signal PWM21-PWM24 based on the second compensation angle θ2.

In one embodiment, as compared with the resonant DC/DC power converting circuit 1000D shown in FIG. 7, the first current processing unit 1520 of the resonant DC/DC power converting circuit 1000E in FIG. 8 further comprises a third logic unit 1525, the second current processing unit 1530 of the resonant DC/DC power converting circuit 1000E further comprises a fourth logic unit 1535 in FIG. 8. The third logic unit 1525 is configured to receive the first compensation signal vc1 and the second compensation signal vc2 and subtract the first compensation signal vc1 from the second compensation signal vc2 to generate a first current compensation difference signal. The first proportionality constant converter 1524 receives and converts the first current compensation difference signal to generate the first compensation angle θ1 correspondingly. In addition, the fourth logic unit 1535 is configured to receive the first compensation signal vc1 and the second compensation signal vc2 and subtract the second compensation signal vc2 from the first compensation signal vc1 to generate a second current compensation difference signal. The second proportionality constant converter 1534 receives and converts the second current compensation difference signal to generate the second compensation angle θ2 correspondingly. In this manner, owing to the third logic unit 1525 and the fourth logic unit 1535 being added to the resonant DC/DC power converting circuit 1000E, the speed of current-balance adjustment of the resonant DC/DC power converting circuit 1000E is increased.

A description is provided with reference to FIG. 8. In still another embodiment, the first reference current Iref1 received by the first arithmetic logic unit 1522 may be the current of the second resonant unit 1220. The second reference current Iref2 received by the second arithmetic logic unit 1532 may be the current of the first resonant unit 1120. Hence, as compared with the resonant DC/DC power converting circuit 1000D in FIG. 7, the resonant DC/DC power converting circuit 1000E does not need to detect the output current $I_o$ at the common output terminal N1 so as to further increase the speed of current-balance adjustment of the resonant DC/DC power converting circuit 1000E. Additionally, the current of the first resonant unit 1120 received by the first current processing unit 1520 may be the output current $I_{o1}$ of the first resonant unit 1120. The current of the second resonant unit 1220 received by the second current processing unit 1530 may be the output current $I_{o2}$ of the second resonant unit 1220.

Figure 9:
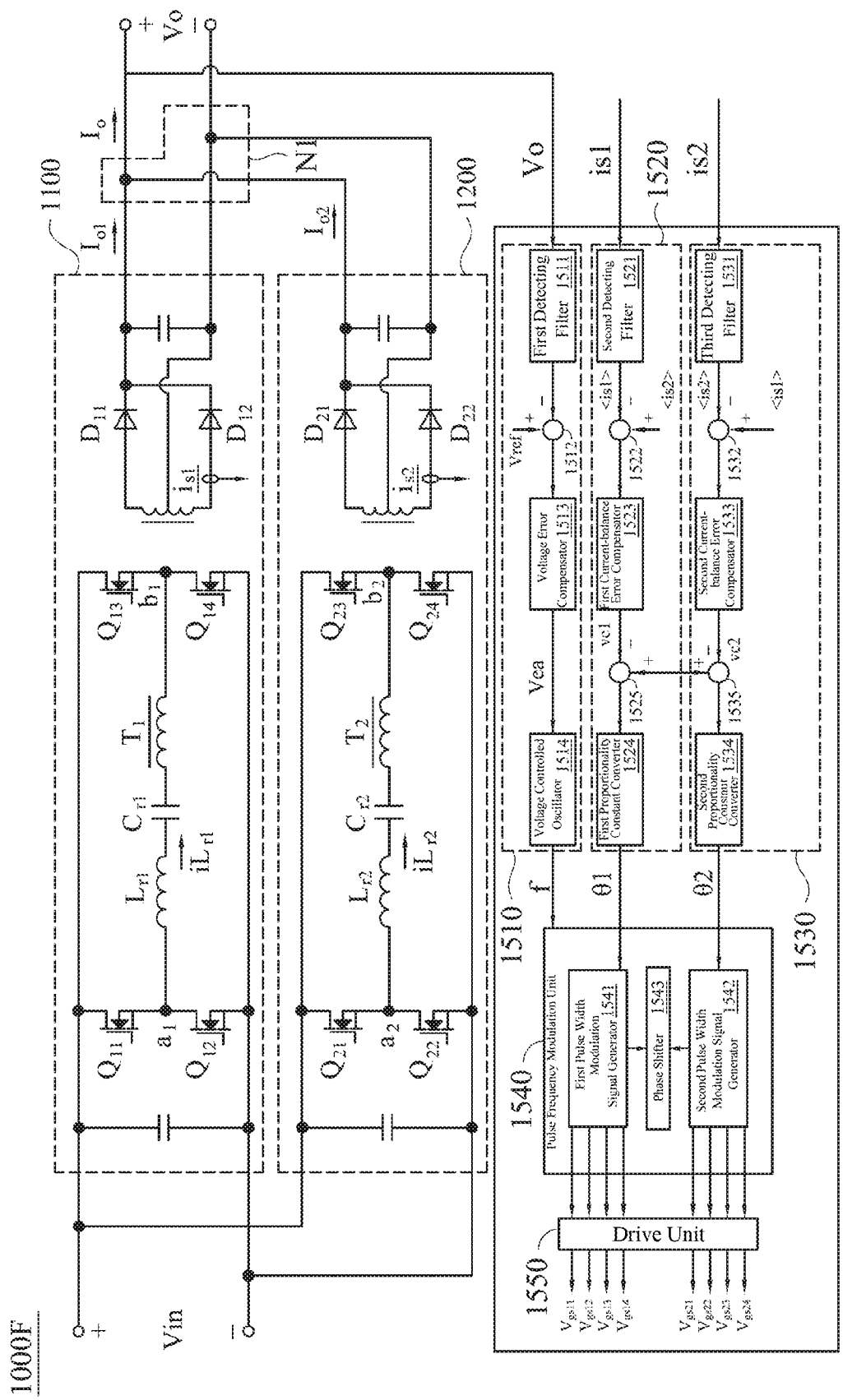
FIG. 9 depicts a schematic diagram of a resonant DC/DC power converting circuit according to yet another embodiment of this invention.

FIG. 9 depicts a schematic diagram of a resonant DC/DC power converting circuit 1000F according to yet another embodiment of this invention. The resonant DC/DC power converting circuit 1000F shown in FIG. 9 may be one of the methods to realize the resonant DC/DC power converting circuit 1000B shown in FIG. 5. For example, the pretreatment filtering block 1712 in FIG. 5 may be realized by the second detecting filter 1521 and a third detecting filter 1531 shown in FIG. 9. The error calculation block 1714 in FIG. 5 may be realized by the first arithmetic logic unit 1522 and the second arithmetic logic unit 1532 shown in FIG. 9. The error compensator 1722 in FIG. 5 may be realized by the first current-balance error compensator 1523 and the second current-balance error compensator 1533 shown in FIG. 9. The compensation angle convertor 1724 in FIG. 5 may be realized by the first proportionality constant converter 1524, the second proportionality constant converter 1524, and the pulse frequency modulation unit 1540 shown in FIG. 9.

A description is provided with reference to FIG. 9. The second detecting filter 1521 is configured to filter a current $I_{s1}$ of the first converter 1100 (such as a primary current of a transformer of the first resonant unit (resonant current), a secondary current or a secondary rectified current of the transformer). The third detecting filter 1531 is configured to filter a current $I_{s2}$ of the second converter 1200 (such as a primary current of a transformer of the second resonant unit (resonant current), a secondary current or a secondary rectified current of the transformer). After that, the first arithmetic logic unit 1522 is configured to receive the filtered current $I_{s1}$ of the first converter 1100 and the current $I_{s2}$ of the second converter 1200 and subtract the filtered current $I_{s1}$ of the first converter 1100 from the current $I_{s2}$ of the second converter 1200 to generate the first difference value signal. The second arithmetic logic unit 1532 is configured to receive the filtered current $I_{s2}$ of the second converter 1200 and the current $I_{s1}$ of the first converter 1100 and subtract the filtered current $I_{s2}$ of the second converter 1200 from the current $I_{s1}$ of the first converter 1100 to generate the second difference value signal.

Then, the first current-balance error compensator 1523 is configured to receive the first difference value signal to generate the first compensation signal vc1. The second current-balance error compensator 1533 is configured to receive the second difference value signal to generate the second compensation signal vc2. After that, the first proportionality constant converter 1524 generates the first compensation angle θ1 based on the first compensation signal vc1. The second proportionality constant converter 1534 generates the second compensation angle θ2 based on the second compensation signal vc2. The pulse frequency modulation unit 1540 is then configured to receive the first compensation angle θ1 and the second compensation angle θ2 and output the first pulse width modulation signal to the fourth pulse width modulation signal PWM11-PWM14 based on the first compensation angle θ1 and the fifth pulse width modulation signal to the eighth pulse width modulation signal PWM21-PWM24 based on the second compensation angle θ2.

As compared with the resonant DC/DC power converting circuit 1000E shown in FIG. 8, the current of the first resonant unit 1120 received by the first current processing unit 1520 of the resonant DC/DC power converting circuit 1000E in FIG. 9 is the primary current of the transformer of the first resonant unit 1120 (resonant current) or the secondary current or secondary rectified current of the transformer. However, the present invention is not limited in this regard. The current of the first resonant unit 1120 may also be another current proportional to the output current. The current of the second resonant unit 1220 received by the second current processing unit 1530 may be the primary current of the transformer of the second resonant unit 1220 (resonant current) or the secondary current or secondary rectified current of the transformer. However, the present invention is not limited in this regard. The current of the second resonant unit 1220 may also be another current proportional to the output current.

A description is provided with reference to FIG. 7, FIG. 8, and FIG. 9. The phase adjustment unit comprises the pulse frequency modulation unit 1540 and a drive unit 1550. The pulse frequency modulation unit 1540 is configured to receive the frequency f, the first compensation angle θ1, and the second compensation angle θ2 and output the first pulse width modulation signal to the fourth pulse width modulation signal PWM11-PWM14 based on the frequency f and the first compensation angle θ1 and the fifth pulse width modulation signal to the eighth pulse width modulation signal PWM21-PWM24 based on the frequency f and the second compensation angle θ2. The drive unit 1550 is configured to receive the first pulse width modulation signal to the fourth pulse width modulation signal PWM11-PWM14 and adjust the phases of the first driving signal to the fourth driving signal $V_{gs11}$-$V_{gs14}$ based on the first pulse width modulation signal to the fourth pulse width modulation signal PWM11-PWM14, or receive the fifth pulse width modulation signal to the eighth pulse width modulation signal PWM21-PWM24 and adjust the phases of the fifth driving signal to the eighth driving signal $V_{gs21}$-$V_{gs24}$ based on the fifth pulse width modulation signal to the eighth pulse width modulation signal PWM21-PWM24.

A description is provided with reference to FIG. 7, FIG. 8, and FIG. 9. In one embodiment, the pulse frequency modulation unit 1540 comprises a first pulse width modulation signal generator 1541, a second pulse width modulation signal generator 1542, and a phase shifter 1543. The first pulse width modulation signal generator 1541 is configured to output the first pulse width modulation signal to the fourth pulse width modulation signal PWM11-PWM14 based on the frequency f and the first compensation angle θ1. The second pulse width modulation signal generator 1542 is configured to output the fifth pulse width modulation signal to the eighth pulse width modulation signal PWM21-PWM24 based on the frequency f and the second compensation angle θ2. The phase shifter 1543 is configured to render the phases of the first pulse width modulation signal to the fourth pulse width modulation signal PWM11-PWM14 to be different from the phases of the fifth pulse width modulation signal to the eighth pulse width modulation signal PWM21-PWM24 by 90 degrees.

A description is provided with reference to FIG. 7, FIG. 8, and FIG. 9. In still another embodiment, the voltage processing unit 1510 comprises a first detecting filter 1511. The first detecting filter 1511 is configured to filter the output voltage $V_o$ at the common output terminal N1. The first current processing unit 1520 comprises the second detecting filter 1521. The second detecting filter 1521 is configured to filter the output current of the first resonant unit 1120, or the primary current, the secondary current, or the secondary rectified current of the transformer of the first resonant unit 1120. The second current processing unit 1530 comprises the third detecting filter 1531. The third detecting filter 1531 is configured to filter the output current of the second resonant unit 1220, or the primary current, the secondary current, or the secondary rectified current of the transformer of the second resonant unit 1220. When realizing the present invention, the first detecting filter 1511 may be formed by connecting a divider resistor and an RC filter circuit. Additionally, each of the second detecting filter 1521 and the third detecting filter 1531 may be formed by connecting a sampling resistor and an RC filter circuit, or connecting a Hall sampler and an RC filter circuit, etc. In addition, the second current processing unit 1530 in FIG. 7 may comprise the two third detecting filters 1531A, 1531B. Additionally, the second detecting filter 1521 may be a rectifying detecting filter, and the third detecting filter 1531 may be a rectifying detecting filter in FIG. 9.

Figure 10:
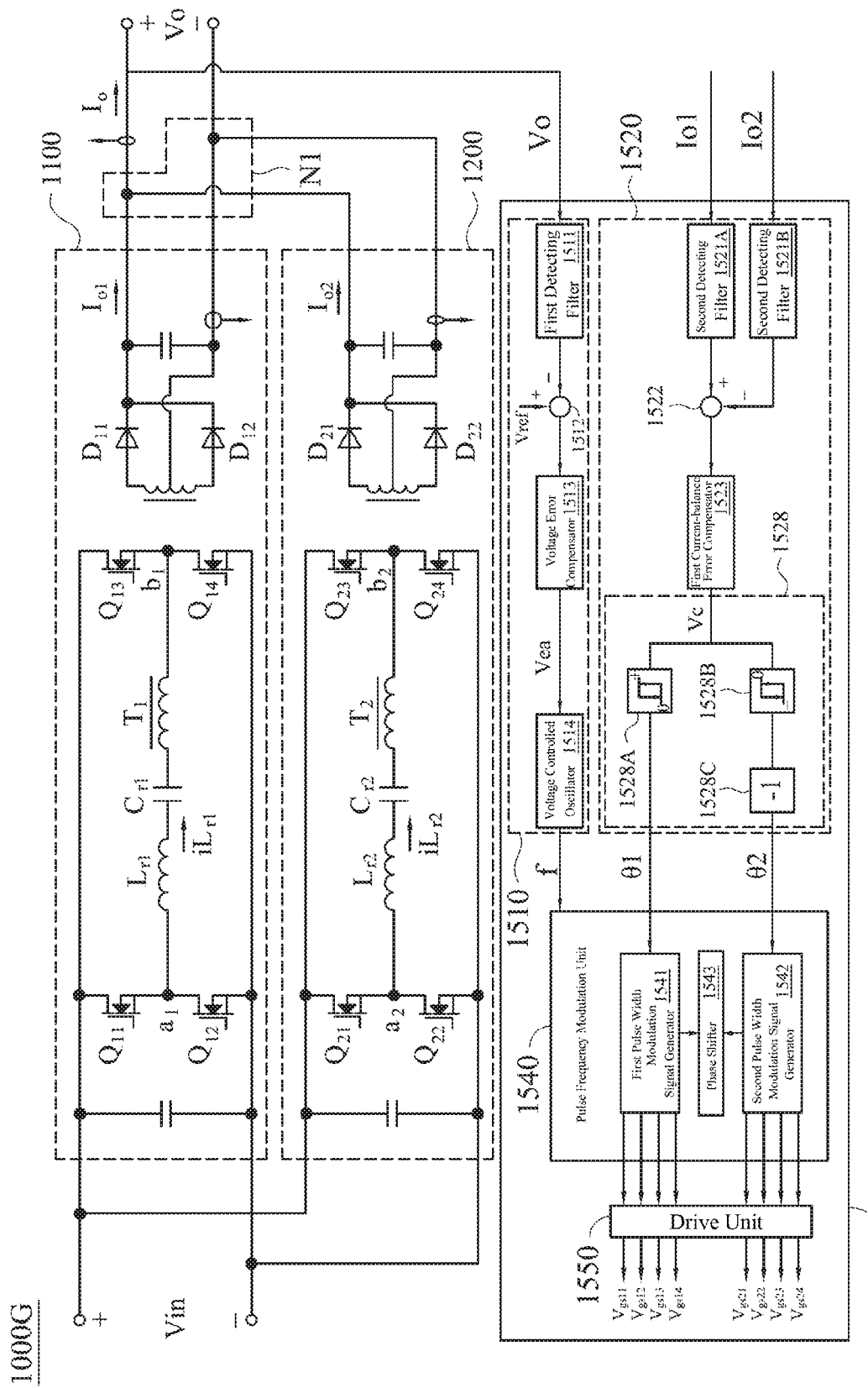
FIG. 10 depicts a schematic diagram of a resonant DC/DC power converting circuit according to another embodiment of this invention.

FIG. 10 depicts a schematic diagram of a resonant DC/DC power converting circuit 1000G according to another embodiment of this invention. The resonant DC/DC power converting circuit 1000G shown in FIG. 10 may be one of the methods to realize the resonant DC/DC power converting circuit 1000C shown in FIG. 6. For example, the pretreatment filtering block 1712 in FIG. 6 may be realized by a second detecting filter 1521A and a second detecting filter 1521B shown in FIG. 10. The error calculation block 1714 in FIG. 6 may be realized by the first arithmetic logic unit 1522 shown in FIG. 10. The error compensator 1722 in FIG. 6 may be realized by the first current-balance error compensator 1523 shown in FIG. 10. The angle compensation block for the second converter 1726 in FIG. 6 may be realized by a compensation angle generator 1528 and the pulse frequency modulation unit 1540 shown in FIG. 10.

A description is provided with reference to FIG. 10. The second detecting filter 1521A is configured to filter the output current $I_{o1}$ of the first converter 1100. The second detecting filter 1521B is configured to filter the output current $I_{o2}$ of the second converter 1200. After that, the first arithmetic logic unit 1522 is configured to receive the filtered output current $I_{o1}$ of the first converter 1100 and the filtered output current $I_{o2}$ of the second converter 1200 and subtract the filtered output current $I_{o2}$ of the second converter 1200 from the filtered output current $I_{o1}$ of the first converter 1100 to generate the difference value signal.

Then, the first current-balance error compensator 1523 is configured to receive the difference value signal to generate a compensation signal vc. After that, the compensation angle generator 1528 generates the first compensation angle θ1 and the second compensation angle θ2 based on the compensation signal vc. The pulse frequency modulation unit 1540 is then configured to receive the first compensation angle θ1 and the second compensation angle θ2 and output the first pulse width modulation signal to the fourth pulse width modulation signal PWM11-PWM14 based on the first compensation angle θ1 and the fifth pulse width modulation signal to the eighth pulse width modulation signal PWM21-PWM24 based on the second compensation angle θ2.

As compared with the resonant DC/DC power converting circuits 1000D-1000F shown in FIGS. 7-9, the control circuit of the resonant DC/DC power converting circuit 1000G in FIG. 10 comprises the voltage processing unit 1510, a current processing unit 1520, and the phase adjustment unit. The voltage processing unit 1510 is configured to receive the output voltage $V_o$ at the common output terminal N1 and the reference voltage Vref and compare the output voltage $V_o$ at the common output terminal N1 with the reference voltage Vref to generate the voltage comparison result, and output the frequency f based on the voltage comparison result. The current processing unit 1520 is configured to receive the current of the first resonant unit 1120 and the current of the second resonant unit 1220 and compare the current of the first resonant unit 1120 with the current of the second resonant unit 1220 to generate a current comparison result, and output the first compensation angle θ1 and the second compensation angle θ2 based on the current comparison result. The phase adjustment unit is configured to receive the frequency together with the first compensation angle θ1 or the second compensation angle θ2 and adjust the phases of the first driving signal to the fourth driving signals $V_{gs11}$-$V_{gs14}$ based on the frequency f and the first compensation angle θ1 or the phases of the fifth driving signal to the eighth driving signals $V_{gs21}$-$V_{gs24}$ based on the frequency f and the second compensation angle θ2.

A description is provided with reference to FIG. 10. In one embodiment, the voltage processing unit 1510 comprises the arithmetic logic unit 1512, the voltage error compensator 1513, and the voltage controlled oscillator 1514. The arithmetic logic unit 1512 is configured to receive the output voltage Vo at the common output terminal N1 and the reference voltage Vref and subtract the output voltage Vo at the common output terminal N1 from the reference voltage Vref to generate the voltage difference signal. The voltage error compensator 1513 is configured to receive the voltage difference signal to generate the voltage compensation signal Vea. The voltage controlled oscillator 1514 is configured to receive and convert the voltage compensation signal Vea to generate the frequency f.

A description is provided with reference to FIG. 10. In still another embodiment, the current processing unit 1520 comprises the arithmetic logic unit 1522, the current-balance error compensator 1523, and the compensation angle generator 1528. The arithmetic logic unit 1522 is configured to receive the current of the first resonant unit 1120 and the current of the second resonant unit 1220 and subtract the current of the second resonant unit 1220 from the current of the first resonant unit 1120 to generate a current difference signal. The current-balance error compensator 1523 is configured to receive the current difference signal to generate a current compensation signal Vc. The compensation angle generator 1528 is configured to receive the current compensation signal Vc and generate the first compensation angle θ1 and the second compensation angle θ2 based on the current compensation signal Vc.

A description is provided with reference to FIG. 10. In yet another embodiment, the compensation angle generator 1528 comprises a positive amplitude limit unit 1528A, a negative amplitude limit unit 1528B, and an inverting unit 1528C. If a value of the current compensation signal Vc is positive, the positive amplitude limit unit 1528A outputs the first compensation angle θ1. If the value of the current compensation signal Vc is negative, the current compensation signal Vc passes through the negative amplitude limit unit 1528B and the inverting unit 1528C to output the second compensation angle θ2.

For example, an output current difference value $I_{o1}$-$I_{o2}$ of the two phase converters is transmitted to the current-balance error compensator 1523. The current-balance error compensator 1523 outputs the current compensation signal Vc. When $I_{o1}$-$I_{o2}$>0, Vc≥0. The current compensation signal Vc passes though the positive amplitude limit unit 1528A to obtain the first compensation angle θ1≥0. The first converter 1100 fine-tunes the diving phases based on the first compensation angle θ1. The current compensation signal Vc passes though the negative amplitude limit unit 1528A and the inverting unit 1528C to output θ2=0 so the driving of the second converter 1200 is not adjusted. When $I_{o1}$-$I_{o2}$<0, Vc≤0. The current compensation signal Vc passes though the positive amplitude limit unit 1528A to output θ1=0 so the driving of the first converter 1100 is not adjusted. The current compensation signal Vc passes though the negative amplitude limit unit 1528B and the inverting unit 1528C to output the second compensation angle θ2≥0. The second converter 1200 fine-tunes the diving phases based on the second compensation angle θ2. Finally, the first compensation angle θ1 and the second compensation angle θ2 are obtained to achieve phase-shifting current-balance control.

Figure 11:
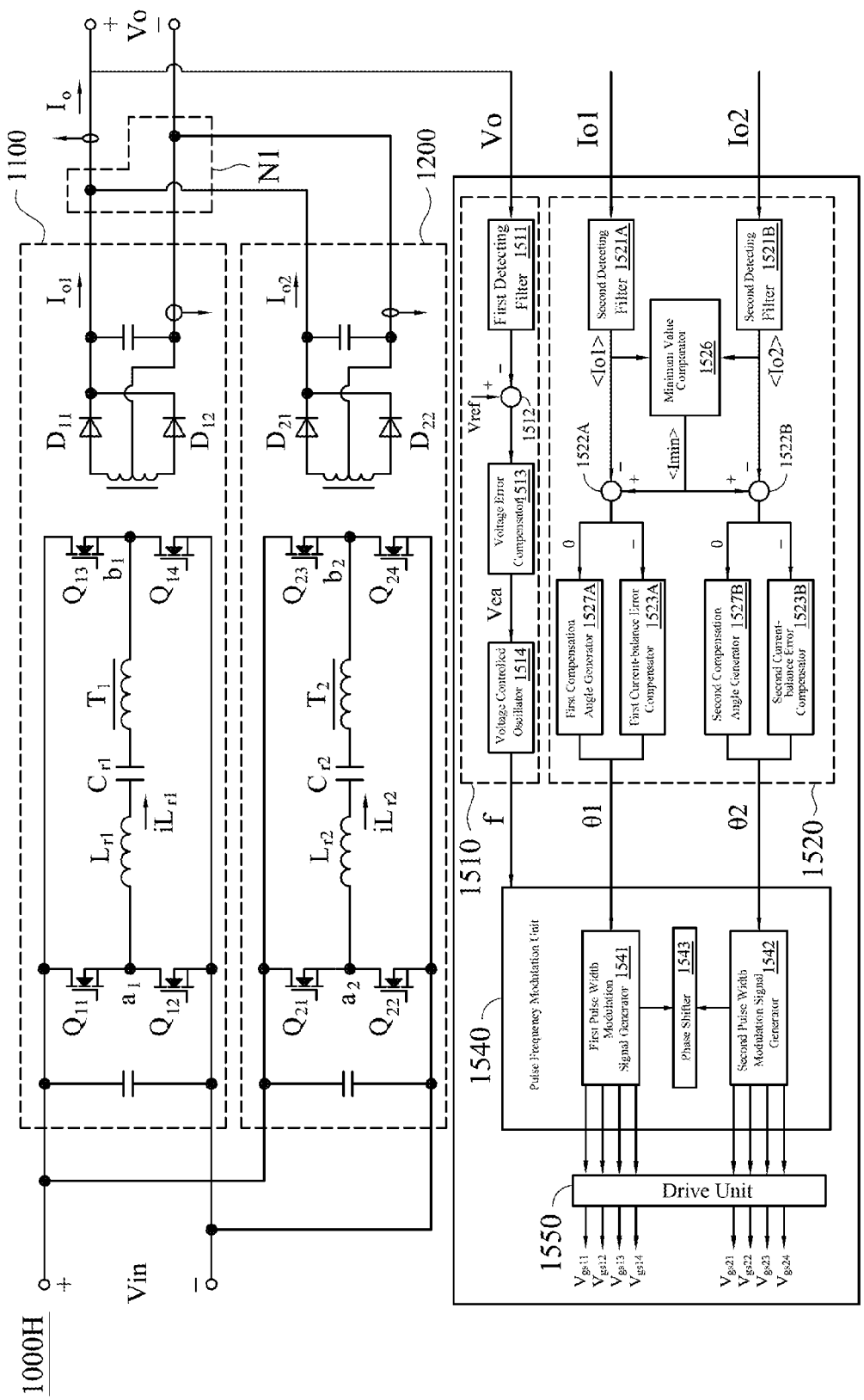
FIG. 11 depicts a schematic diagram of a resonant DC/DC power converting circuit according to still another embodiment of this invention.

FIG. 11 depicts a schematic diagram of a resonant DC/DC power converting circuit 1000H according to still another embodiment of this invention. The resonant DC/DC power converting circuit 1000H shown in FIG. 11 may be one of the methods to realize the resonant DC/DC power converting circuit 1000B shown in FIG. 5. For example, the pretreatment filtering block 1712 in FIG. 5 may be realized by the second detecting filter 1521A and the second detecting filter 1521B shown in FIG. 11. The error calculation block 1714 in FIG. 5 may be realized by a first logic unit 1522A and a second logic unit 1522B shown in FIG. 11. The error compensator 1722 in FIG. 5 may be realized by a first current-balance error compensator 1523A and a second current-balance error compensator 1523B shown in FIG. 11. The compensation angle convertor 1724 in FIG. 5 may be realized by a first compensation angle generator 1527A, a second compensation angle generator 1527B, and the pulse frequency modulation unit 1540 shown in FIG. 11.

A description is provided with reference to FIG. 11. The second detecting filter 1521A is configured to filter the output current $I_{o1}$ of the first converter 1100. The second detecting filter 1521B is configured to filter the output current $I_{o2}$ of the second converter 1200. After that, the first arithmetic logic unit 1522A is configured to receive the filtered output current $I_{o1}$ of the first converter 1100 and a minimum value Imin and subtract the filtered output current $I_{o1}$ of the first converter 1100 from the minimum value 1 min to generate the first difference value signal. The second arithmetic logic unit 1522B is configured to receive the filtered output current $I_{o2}$ of the second converter 1200 and the minimum value Imin and subtract the filtered output current $I_{o2}$ of the second converter 1200 from the minimum value 1 min to generate the second difference value signal.

Then, the first current-balance error compensator 1523A generates the first compensation angle $\theta 1$ based on the first difference value signal. The second current-balance error compensator 1523B generates the second compensation angle $\theta 2$ based on the second difference value signal. The pulse frequency modulation unit 1540 is then configured to receive the first compensation angle $\theta 1$ and the second compensation angle $\theta 2$ and output the first pulse width modulation signal to the fourth pulse width modulation signal PWM11-PWM14 based on the first compensation angle $\theta 1$ and the fifth pulse width modulation signal to the eighth pulse width modulation signal PWM21-PWM24 based on the second compensation angle $\theta 2$.

As compared with the resonant DC/DC power converting circuit 1000G shown in FIG. 10, the resonant DC/DC power converting circuit 1000H in FIG. 11 further comprises a minimum value comparator 1526. In addition, in order to cooperate with the minimum value comparator 1526, the resonant DC/DC power converting circuit 1000H comprises the first logic unit 1522A, the first current-balance error compensator 1523A, the second logic unit 1522B, and the second current-balance error compensator 1523B. The minimum value comparator 1526 is configured to receive the current of the first resonant unit 1120 and the current of the second resonant unit 1220 and compare the current of the first resonant unit 1120 with the current of the second resonant unit 1220, and set whichever of the current of the first resonant unit 1120 and the current of the second resonant unit 1220 has a smaller current value to be the minimum current. The first logic unit 1522A is configured to receive the current of the first resonant unit 1120 and the minimum current and subtract the current of the first resonant unit 1120 from the minimum current to generate the first current difference signal. If a value of the first current difference signal is negative, the first current-balance error compensator 1523A outputs the first compensation angle $\theta 1$. Additionally, the second logic unit 1522B is configured to receive the current of the second resonant unit 1220 and the minimum current and subtract the current of the second resonant unit 1220 from the minimum current to generate the second current difference signal. If a value of the second current difference signal is negative, the second current-balance error compensator 1523B outputs the second compensation angle $\theta 2$.

In still another embodiment, the current processing unit 1520 comprises the first compensation angle generator 1527A and the second compensation angle generator 1527B. If the value of the first current difference signal is zero, the first compensation angle generator 1527A outputs the first compensation angle $\theta 1$ and a value of the first compensation angle $\theta 1$ is zero. If the value of the second current difference signal is zero, the second compensation angle generator 1527B outputs the second compensation angle $\theta 2$ and a value of the second compensation angle $\theta 2$ is zero.

The technical concept of the resonant DC/DC power converting circuit 1000H in FIG. 11 is to keep one driving phase unchanged and only perform a phase-shifting fine tune to the other driving phase. Hence, the phase-shifting adjustment does not need to be performed to the converter having a smaller current and is only performed to the converter having a greater current. A voltage across two terminals of the resonant network is thus decreased to reduce the current so as to approximate to the target value which is the smaller current. The target value which is the smaller current changes in real time and will eventually be approximately equal to $I_o/2$ so as to achieve the steady state of current-balance operation of the system. For example, detect the output voltage $V_o$, the output currents $I_{o1}$, $I_{o2}$ of the two phases. The voltage processing unit controls the switching frequency f. The output currents $I_{o1}$, $I_{o2}$ are detected and filtered and then pass through the minimum value comparator 1526 to obtain the minimum value 1 min. For each of the phases, the output currents $I_{oi}$ (i=1, 2) are respectively compared with the minimum value Imin. If $I_{oi}$=1 min, then $\theta 1$=0 so no phase-shifting fine tune is performed. If $I_{oi}$>Imin, a phase-shifting fine tune is performed to the each of the phases. $\theta i$ is determined by the first current-balance error compensator 1523A and the second current-balance error compensator 1523B. The voltage of the resonant network is thus reduced so that $I_{oi}$=1 min. Owing to the adjustment of the control circuit 1500, Imin is increased in real time and finally is approximately equal to $I_o/2$ to allow $I_{oi}$=$I_o/2$ so as to achieve current balance.

Figure 12:
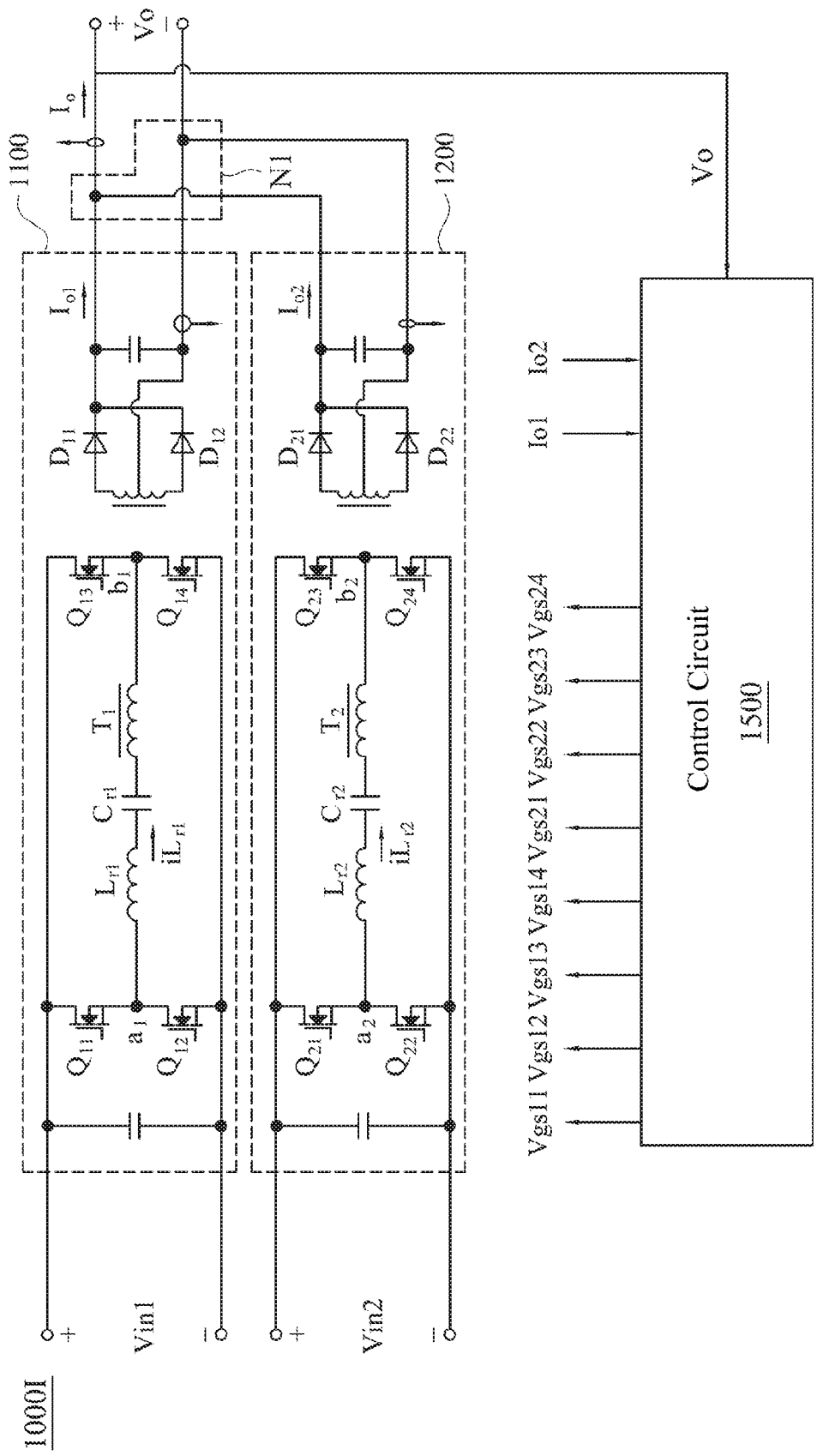
FIG. 12 depicts a schematic diagram of a resonant DC/DC power converting circuit according to yet another embodiment of this invention.

FIG. 12 depicts a schematic diagram of a resonant DC/DC power converting circuit 1000I according to yet another embodiment of this invention. As compared with the other resonant DC/DC power converting circuits in which the input terminals are connected in parallel, the input terminal of the first converter 1100 is independent of the input terminal of the second converter 1200 in the resonant DC/DC power converting circuit 1000I.

Figure 13:
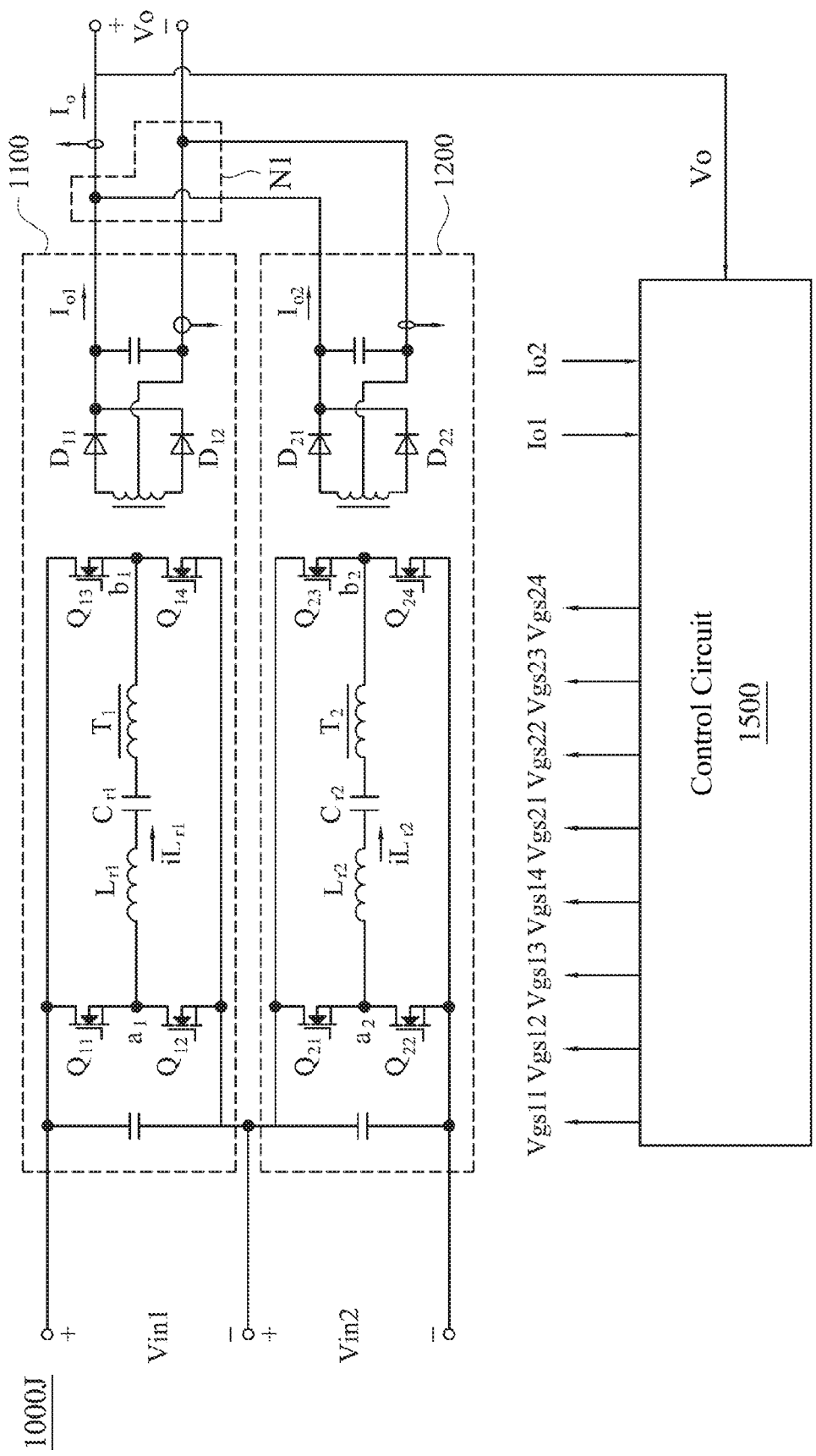
FIG. 13 depicts a schematic diagram of a resonant DC/DC power converting circuit according to another embodiment of this invention.

FIG. 13 depicts a schematic diagram of a resonant DC/DC power converting circuit 1000J according to another embodiment of this invention. As compared with the other resonant DC/DC power converting circuits in which the input terminals are connected in parallel or the input terminals are independent of each other, the input terminal of the first converter 1100 and the input terminal of the second converter 1200 are connected in series in the resonant DC/DC power converting circuit 1000J. In summary, the input terminal of the first converter 1100 and the input terminal of the second converter 1200 of the resonant DC/DC power converting circuit may be connected in parallel, in series, or be independent of each other depending on the situation according to embodiments of the present invention.

Figure 14A:
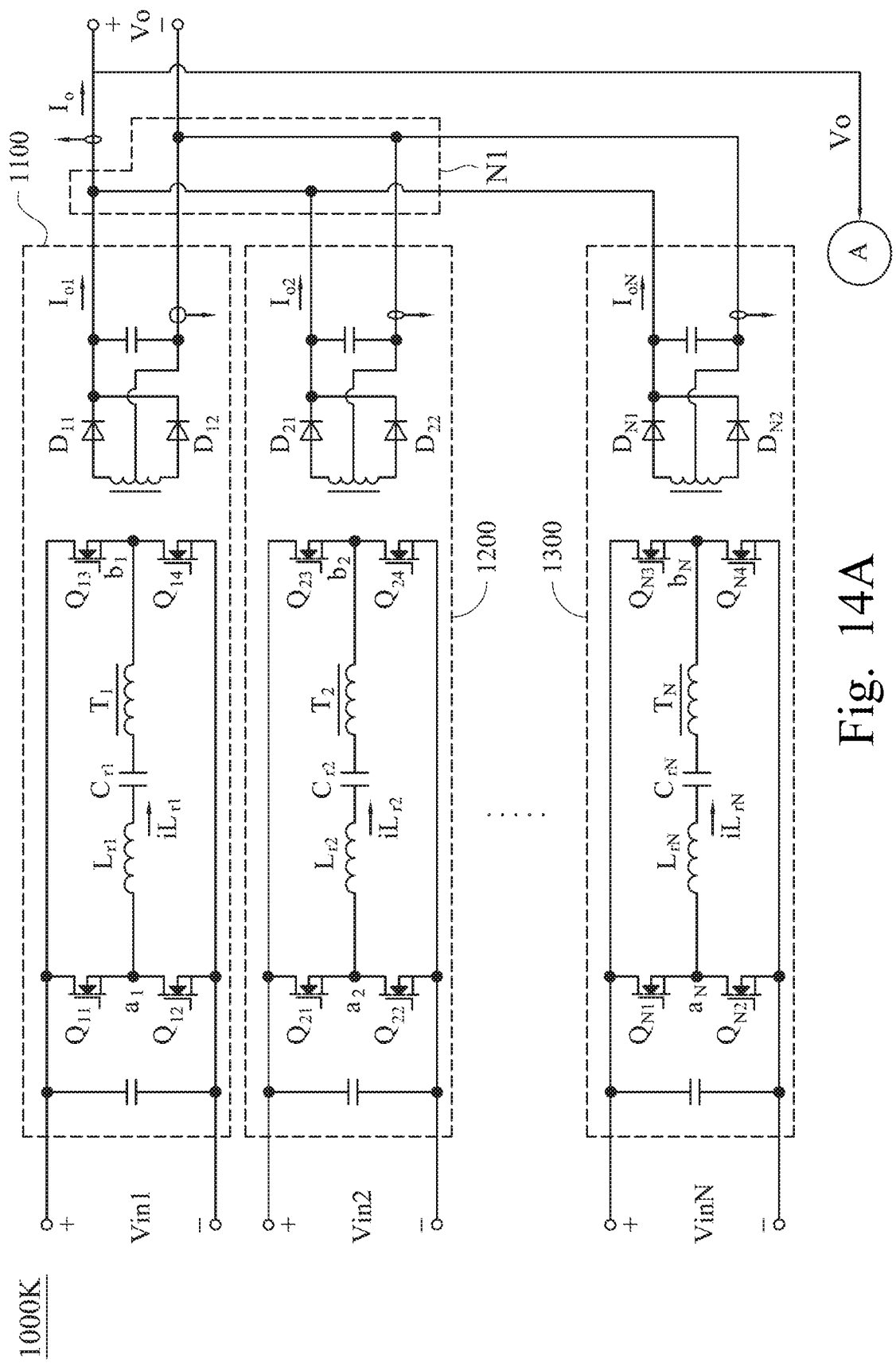
FIG. 14A depicts a schematic diagram of a partial electric circuit of a resonant DC/DC power converting circuit according to still another embodiment of this invention.
Figure 14B:
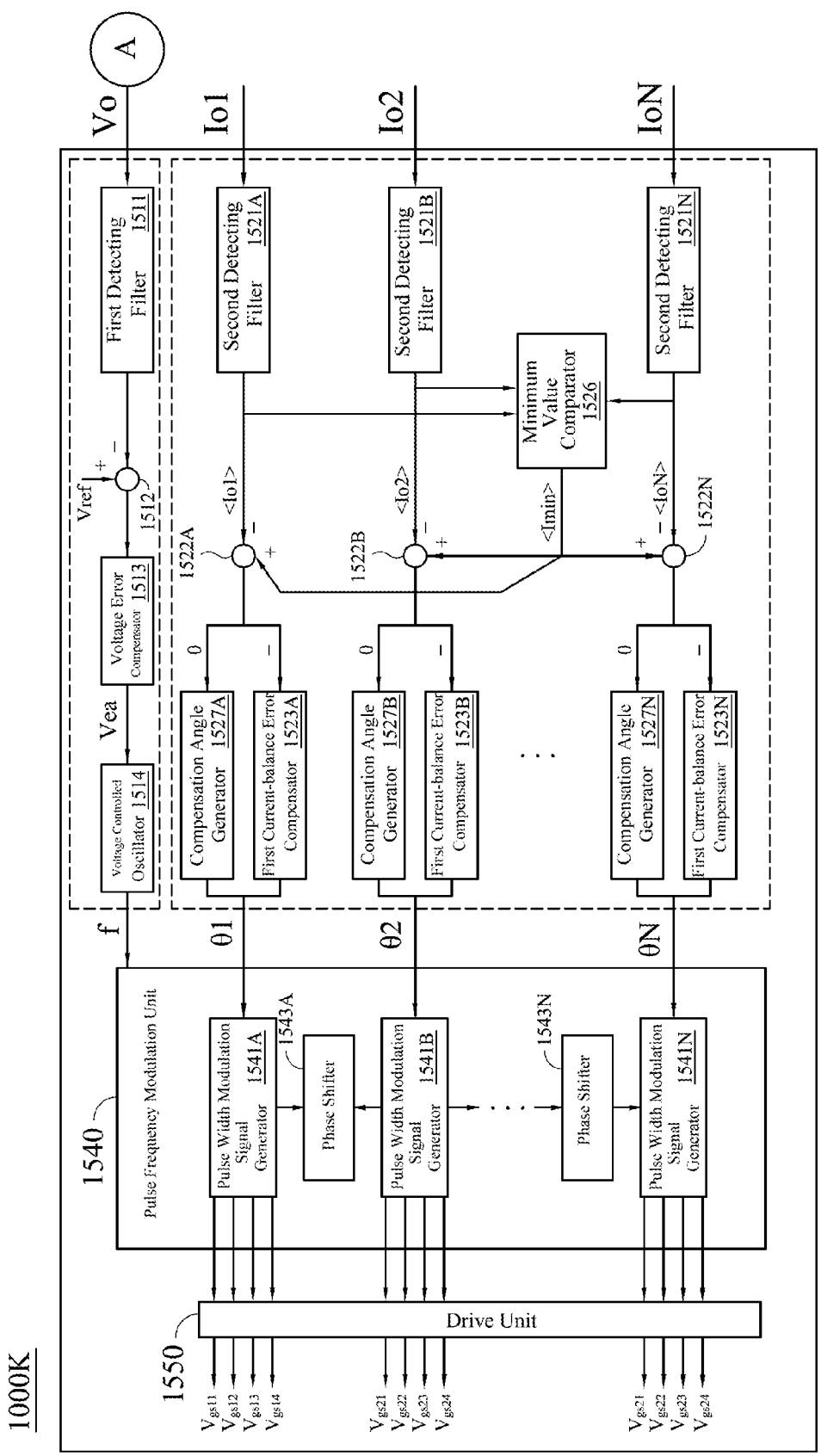
FIG. 14B depicts a schematic diagram of another partial electric circuit of a resonant DC/DC power converting circuit according to still another embodiment of this invention.

FIG. 14A depicts a schematic diagram of a partial electric circuit of a resonant DC/DC power converting circuit 1000K according to still another embodiment of this invention. FIG. 14B depicts a schematic diagram of another partial electric circuit of the resonant DC/DC power converting circuit 1000K according to still another embodiment of this invention. As compared with the resonant DC/DC power converting circuits 1000H in FIG. 11, the resonant DC/DC power converting circuits 1000K is expanded to N converters. Each device corresponding to the control circuit 1500 is also expanded to N pieces accordingly. Since the electric circuit structure of the resonant DC/DC power converting circuit 1000K which is expanded to N converters has been described in FIG. 4, a further description is provided.

In the resonant DC/DC power converting circuit 1000K shown in FIG. 14B, the current processing unit 1520 comprises the minimum value comparator 1526, the first logic unit 1522A to the Nth logic unit 1522N, and the first current-balance error compensator 1523A to the Nth current-balance error compensator 1523N. The minimum value comparator 1526 is configured to receive currents of the first resonant unit 1120 to the Nth resonant unit and compare the currents of the first resonant unit 1120 to the Nth resonant unit, and set whichever of the currents of the first resonant unit 1120 to the Nth resonant unit has a smallest current value to be the minimum current. The first logic unit 1522A to the Nth logic unit 1522N are respectively configured to receive the currents of the first resonant unit 1120 to the Nth resonant unit and receive the minimum current. The first logic unit 1522A to the Nth logic unit 1522N respectively subtract the currents of the first resonant unit 1120 to the Nth resonant unit from the minimum current to generate the first current difference signal to the Nth current difference signal, or subtract the minimum current respectively from the currents of the first resonant unit 1120 to the Nth resonant unit to generate the first current difference signal to the Nth current difference signal. If a value of one of the current difference signals is negative, for example, if the value of the third current difference signal generated by the third logic unit 1522C is negative, the third current-balance error compensator 1523C corresponding to the third logic unit 1522C outputs a compensation angle $\theta3$ correspondingly. In addition, the phase adjustment unit is further configured to receive the frequency f and a compensation angle correspondingly (such as $\theta3$), and adjust phases of the driving signals of the third group of driving signals correspondingly based on the frequency f and the corresponding compensation angle (such as $\theta3$). However, the present invention is not limited to the above embodiment, which only serves as an example for illustrating one of the methods for realizing the present invention. In other embodiments, it is possible that a value of the current difference signal generated by another kind of logic unit is negative, then another current-balance error compensator in the first current-balance error compensator 1523A to the Nth current-balance error compensator 1523N outputs the corresponding compensation angle $\theta1$-$\theta N$.

Figure 15:
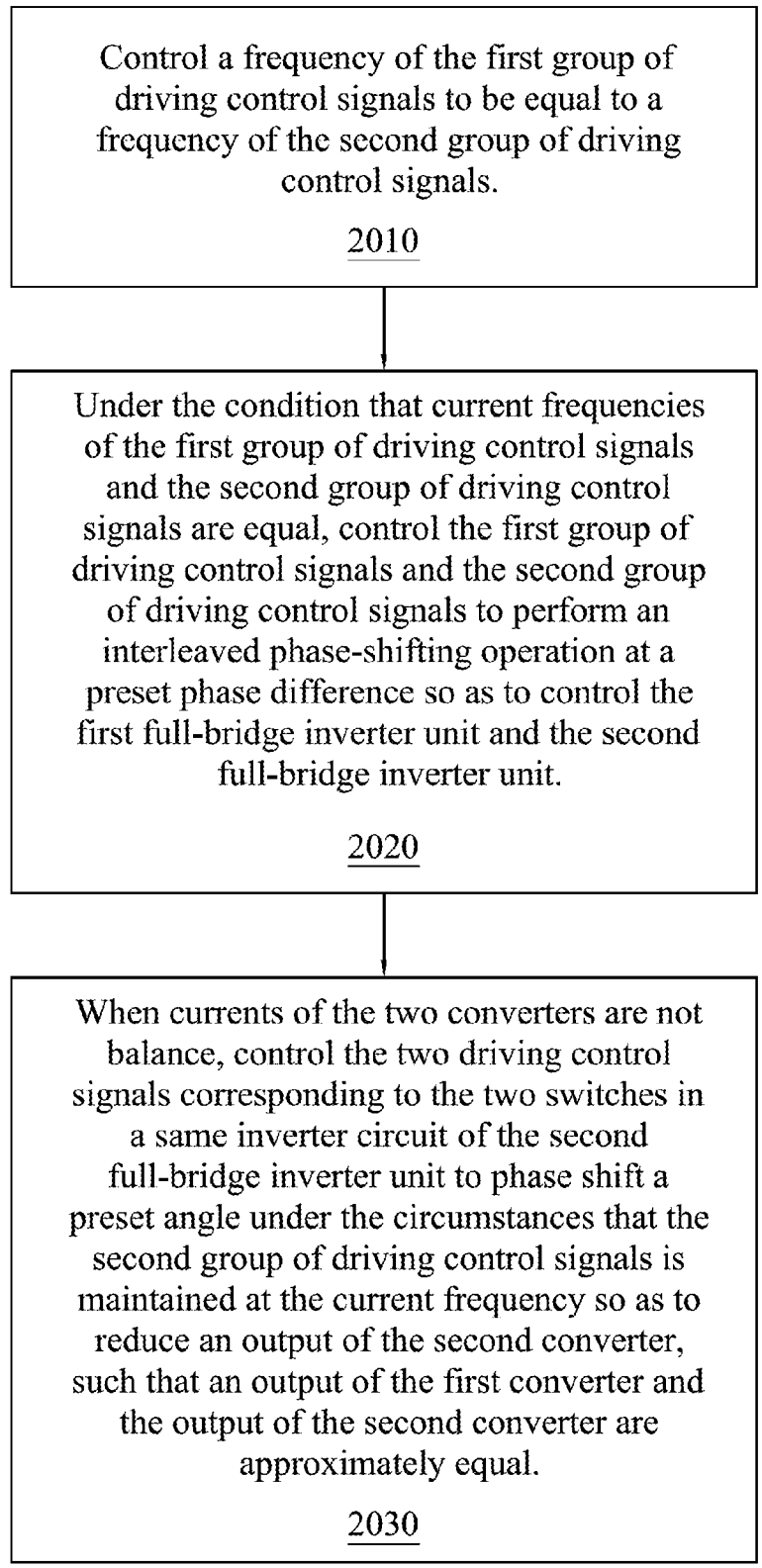
FIG. 15 depicts a flow schematic diagram of a method for controlling a resonant DC/DC power converting circuit according one embodiment of this invention.

FIG. 15 depicts a flow schematic diagram of a method for controlling a resonant DC/DC power converting circuit according one embodiment of this invention. To simplify matters, a description is provided with reference to FIG. 1 and FIG. 15. During normal operation period of the resonant DC/DC power converting circuit 1000, the method for controlling the resonant DC/DC power converting circuit comprises:

Step 2010: controlling a frequency of the first group of driving control signals to be equal to a frequency of the second group of driving control signals.

Step 2020: under the condition that current frequencies of the first group of driving control signals and the second group of driving control signals are equal, controlling the first group of driving control signals and the second group of driving control signals to perform an interleaved phase-shifting operation at a preset phase difference so as to control the first full-bridge inverter unit and the second full-bridge inverter unit; and Step 2030: when currents of the two converters are not balance, controlling the two driving control signals corresponding to the two switches in the same inverter circuit of the second full-bridge inverter unit to phase shift a preset angle under the circumstances that the second group of driving control signals is maintained at the current frequency so as to reduce an output of the second converter, such that an output of the first converter and the output of the second converter are approximately equal.

In step 2010, the control circuit 1500 may control the frequency of the first group of driving signals to be equal to the frequency of the second group of driving signals. In step 2020, under the condition that the current frequencies of the first group of driving control signals and the second group of driving control signals are equal, the control circuit 1500 may control the first group of driving control signals and the second group of driving control signals to perform the interleaved phase-shifting operation at the preset phase difference so as to control the first full-bridge inverter unit 1110 and the second full-bridge inverter unit 1210. In step 2030, when the currents of the two converters 1100, 1200 are not balance, control the two driving control signals corresponding to the two switches in the same inverter circuit of the second full-bridge inverter unit to phase shift a preset angle under the circumstances that the second group of driving control signals is maintained at the current frequency so as to reduce the output of the second converter 1200, such that the output of the first converter 1100 and the output of the second converter 1200 are approximately equal.

In another embodiment, during normal operation period of the resonant DC/DC power converting circuit 1000, the method for controlling the resonant DC/DC power converting circuit comprises: making said two converters operate at the same frequency and interleave with preset phase shift; and making two of driving control signals in one group interleave with preset angle to reduce output current of said converter corresponding controlled thereby, when two output currents of said two converters are not approximately equal. In the forgoing step, the control circuit 1500 makes said two converters 1100, 1200 operate at the same frequency and interleave with preset phase shift, and the control circuit 1500 makes two of driving control signals in one group interleave with preset angle to reduce output current of said converter corresponding controlled thereby, when two output currents of said two converters 1100, 1200 are not approximately equal.

In one embodiment, the preset angle is greater than zero and smaller than or equal to $3/10\pi$. In another embodiment, the preset phase difference for the phase-shifting angle between the first group of driving signals (such as $Q_{11}$-$Q_{14}$) and the second group of driving signals (such as $Q_{21}$-$Q_{24}$) is 180/m, m is a number of the converters comprised in the resonant DC/DC power converting circuit. The preset angle is 0 degree. Phase differences between the driving control signals for the switches functionally corresponding in the first full-bridge inverter unit and the second full-bridge inverter unit are: zero degree and 180/m−$\theta$, or 180/m−$\theta$/2 and 180/m+$\theta$/2. In still another embodiment, the above m is equal to 2. For example, the resonant DC/DC power converting circuit 1000A shown in FIG. 1B comprises two converters so m is 2. In yet another embodiment, the controller 1800 is a pulse frequency modulation unit.

A description is provided with reference to FIG. 1 and FIG. 15. In another embodiment, the method for controlling the resonant DC/DC power converting circuit comprises: when the control circuit 1500 controls the two driving control signals corresponding to the two switches in the same inverter circuit of the second full-bridge inverter unit 1210 to phase shift the preset angle, controlling a phase difference between the two driving control signals corresponding to the two switches in a same inverter circuit of the first full-bridge inverter unit 1110 not to change.

A description is provided with reference to FIG. 1 and FIG. 15. In still another embodiment, the method for controlling the resonant DC/DC power converting circuit comprises: controlling the controller to maintain or adjust the current frequencies of the first group of driving control signals and the second group of driving control signals based on an output voltage of the resonant DC/DC power converting circuit.

From the above embodiments of the present invention, it is understood that application of the present invention has the following advantages. According to the embodiments of the present invention, a resonant DC/DC power converting circuit and a method for controlling the same are provided to improve the problem that the resonant converters cannot achieve current balance by adjusting the signal frequencies. The improvement of the current balance is helpful in alleviating the problem caused by the common capacitors at the output terminal or the resonant DC/DC power converting circuit. For example, the common capacitors at the output terminal may be changed to electrolytic capacitors from the original ceramic capacitors. When utilizing the electrolytic capacitors as the capacitors at the output terminals of the resonant DC/DC power converting circuit, the current-balance method and device are helpful in decrease the number of the electrolytic capacitors so as to reduce the volume of the overall device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling a resonant DC/DC power converting circuit, the resonant DC/DC power converting circuit having a converter output and a converter input comprising:
   at least two converters having similar structures and outputs connected in parallel as said converter output, each said converter comprising:
      a full-bridge inverter unit configured with at least four switches; and
      a resonant unit coupled with said full-bridge inverter unit; and
   a controller outputting two groups of driving control signals to drive four switches in said two converters respectively;
   the method for controlling the resonant DC/DC power converting circuit during normal operation comprising:
   making said two converters operate at the same frequency and interleave with preset phase shift; and
   making two of driving control signals in one group interleave with preset angle to reduce output current of said converter corresponding controlled thereby, when output currents of said two converters are not approximately equal.

2. The method of claim 1, wherein the preset phase shift is greater than 0 degree and smaller than 180 degrees.

3. The method of claim 1, wherein the preset phase shift satisfies an equation: 180/m, m represents a number of the converters comprised in the resonant DC/DC power converting circuit, the preset angle θ degree is set to adjust the phase shift between two groups.

4. The method of claim 3, wherein m is equal to 2.

5. The method of claim 3, wherein: keeping two driving control signals in one group with phase shift 180/m compared to two corresponding signals in the other group; adjusting the other two driving control signals in one group with phase shift 180/m−θ compared to two corresponding signals in the other group.

6. The method of claim 3, wherein: adjusting two driving control signals in one group with phase shift 180/m−θ/2 compared to two corresponding signals in the other group; adjusting the other two driving control signals in one group with phase shift 180/m+θ/2 compared to two corresponding signals in the other group.

7. The method of claim 1, further comprising: controlling the controller to maintain or adjust the current frequencies of the two groups based on an output voltage of the resonant DC/DC power converting circuit.

8. A resonant DC/DC power converting circuit having a converter output and a converter input comprising:
   at least two converters having similar structures and outputs connected in parallel as said converter output, each said converter comprising:
      a full-bridge inverter unit configured with at least four switches; and
      a resonant unit coupled with said full-bridge inverter unit;
   a controller configured to output at least two groups of driving control signals for controlling said switches in the two converters respectively;
   a current sampling circuit configured to sample output currents of the two converters respectively to output a first current sampling signal and a second current sampling signal accordingly; and
   a current-balance controller configured to receive the first current sampling signal and the second current sampling signal, once it is determined that the output current of one of the two converters is greater, outputting a preset angle to the controller to make the two driving control signals in the corresponding group for the converter whose output current is greater interleave with the preset angle so as to reduce the output current thereof to achieve balance between output currents of the two converters.

9. The resonant DC/DC power converting circuit of claim 8, wherein the preset angle is greater than 0 degree and smaller than or equal to 3π/10 degrees.

10. The resonant DC/DC power converting circuit of claim 8, wherein the current-balance controller comprises:
   a current discriminator configured to receive a reference signal and the first current sampling signal and the second current sampling signal to output at least a current difference signal when the two current sampling signals are not approximately equal; and
   a current-balance adjuster configured to receive the current difference signal to output the preset angle to the controller.

11. The resonant DC/DC power converting circuit of claim 10, wherein the current discriminator comprises:
- a pretreatment filtering block configured to receive the first current sampling signal and the second current sampling signal conditioned thereby and output a first current sampling process signal and a second current sampling process signal; and
- an error calculation block configured to receive the reference signal, the first current sampling process signal, and the second current sampling process signal to output the current difference signal.

12. The resonant DC/DC power converting circuit of claim 11, wherein the current-balance adjuster comprises:
- an error compensator configured to receive the current difference signal and output a current compensation signal; and
- a compensation angle convertor configured to receive the current compensation signal and output the preset angle to the controller.

13. The resonant DC/DC power converting circuit of claim 10, wherein the reference signal is the smaller one in the first and second current sampling signals, or one half of summation of the first and second current sampling signals.

\* \* \* \* \*